US012499736B2

(12) United States Patent
Tran et al.

(10) Patent No.: US 12,499,736 B2
(45) Date of Patent: Dec. 16, 2025

(54) GAMING DEVICE WITH ACTIVATABLE FEATURE STATES

(71) Applicant: Aristocrat Technologies Australia Pty Limited, North Ryde (AU)

(72) Inventors: Dinh Tran, Wetherhill Park (AU); Amy Batsiokis, North Ryde (AU); Hiram Yu, Mortdale (AU); Nicholas O'Sullivan, Beacon Hill (AU); Philip Seifert, Macquarie Park (AU); Ravi Khatri, Haryana (IN); Sandeep Saharawat, Macquarie Park (AU); Upinder Dhaliwal, Schofields (AU); Lauren Chapple, Huntleys Cove (AU); Romit Aggarwal, Kellyville (AU); Robbert Van Elven, Westleigh (AU); Emily Chew, Sydney (AU); Paul Connelly, Springwood (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 357 days.

(21) Appl. No.: 18/156,896

(22) Filed: Jan. 19, 2023

(65) Prior Publication Data

US 2023/0334949 A1 Oct. 19, 2023

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01)

(58) Field of Classification Search
CPC .. G07F 17/3267; G07F 17/34; G07F 17/3213; G07F 17/3244; G07F 17/3262; G06F 7/588
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 11,062,567 | B2 * | 7/2021 | Fong | G07F 17/34 |
| 2005/0130737 | A1 * | 6/2005 | Englman | G07F 17/32 463/25 |
| 2012/0172107 | A1 * | 7/2012 | Acres | G07F 17/34 463/16 |
| 2016/0086431 | A1 * | 3/2016 | Berman | G07F 17/3286 463/20 |
| 2017/0228976 | A1 * | 8/2017 | Chesworth | G07F 17/3262 |
| 2018/0174404 | A1 * | 6/2018 | Tam | G07F 17/3267 |

* cited by examiner

*Primary Examiner* — Justin L Myhr
(74) *Attorney, Agent, or Firm* — Blank Rome LLP

(57) ABSTRACT

Conducting a feature game based on an active feature state includes displaying a plurality of feature game indicators that indicate respective ones of the current feature states and a feature game to which the respective ones of the current feature states correspond. A defined number of the current feature states to be active for a game instance of a spinning reel game is selected. The display is controlled to visually indicate in connection with the feature game indicators, which of the plurality of feature states were selected to be active feature states for the game instance. An outcome is determined in accordance with the selected symbols for the game instance. Upon a trigger condition for an active feature state being met by the outcome, the feature game is conducted in accordance with the feature state.

20 Claims, 39 Drawing Sheets

300

| | 341 | 342 | 343 | 344 | 345 |
|---|---|---|---|---|---|
| | Reel Strip 1 | Reel Strip 2 | Reel Strip 3 | Reel Strip 4 | Reel Strip 5 |
| 301 | A | 10 | PIC5 | PCI4 | PIC1 |
| 302 | PIC2 | J | Q | PIC2 | 10 |
| 303 | PIC2 | PIC4 | 9 | PIC3 | PIC2 |
| 304 | PIC3 | Q | PIC2 | 9 | Q |
| 305 | Q | A | PIC1 | Q | A |
| 306 | 10 | WILD | 10 | WILD | PIC4 |
| 307 | PIC5 | PIC1 | K | WILD | Q |
| 308 | A | J | WILD | WILD | Q |
| 309 | J | WILD | J | PIC5 | K |
| 310 | 9 | WILD | PIC4 | K | 9 |
| 311 | A | WILD | Q | PIC1 | 9 |
| 312 | PIC3 | PIC4 | PIC3 | A | 10 |
| 313 | 10 | 10 | WILD | A | A |
| 314 | PCI4 | PIC5 | Q | J | A |
| 315 | K | WILD | Q | 10 | PIC2 |
| 316 | PIC1 | J | 10 | A | PIC3 |
| 317 | J | Q | A | WILD | K |
| 318 | Q | A | WILD | 9 | A |
| 319 | PIC4 | PIC2 | WILD | 9 | J |
| 320 | A | PIC3 | WILD | PIC2 | PIC5 |
| 321 | PIC1 | 9 | PIC5 | PIC1 | PIC4 |
| 321 | A | J | 10 | WILD | 10 |
| 323 | J | 10 | PIC3 | PIC5 | J |
| 324 | PIC5 | PIC5 | K | Q | Q |
| 325 | PIC2 | K | 9 | A | PIC3 |
| 330 | ... | ... | ... | ... | ... |

*FIG. 3*

FIG. 32
$8,800.00
$800.01
2 EXTRA FREE GAMES
GROW TO 8 ROWS
CHANGE
TO
TOTAL WIN
$133.90

FIG. 34
3400
$8,800.00
3434
3432
COLLECTED
3431
EXTRA
FREE GAME
GROW TO
6 ROWS
ADD
WILDS
3433
3414
3413
3412
3411
8 FREE GAMES WON!
PRESS START FEATURE
3450
3421
3422
3423
3424
3425

GAMING DEVICE WITH ACTIVATABLE FEATURE STATES

FIELD OF THE INVENTION

The present application relates to a gaming device, a method of operating a gaming device and a system each with activatable feature states.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

There is disclosed a gaming device, a method of operating a gaming device and a system with activatable feature states. A display is controlled to display a plurality of feature game indicators which each indicate a feature game of a spinning reel game and one of a number of possible different states for the feature game. A defined number of the feature indicators are randomly selected to be active for a spinning reel game instance such that the associated feature game can be activated in the indicated state during the spinning reel game upon one or more trigger conditions being met.

An example embodiment describes a gaming device comprising a display, a random number generator, at least one input mechanism operable to input a wager, a processor, and a memory storing (i) reel data defining a plurality of reel strips, (ii) a plurality of current feature states, and (iii) instructions. When the instructions are executed by the processor, cause the processor to control the display to display a plurality of feature game indicators that indicate respective ones of the current feature states and a feature game to which the respective ones of the current feature states correspond, select, using the random number generator, a defined number of the current feature states to be active for a game instance of a spinning reel game, control the display to visually indicate in connection with the feature game indicators, which of the plurality of feature states were selected to be active feature states for the game instance, select for the game instance, based on the reel data and using the random number generator, symbols for a plurality of symbol positions, control the display to display the selected symbols at the symbol positions, evaluate the selected symbols for winning combinations of symbols, an upon a trigger condition being met in respect of an active feature state, conduct a feature game based on the active feature state in respect of which the trigger condition was met.

Another example embodiment describes a method of operating a gaming device comprising a display, a random number generator, at least one input mechanism operable to input a wager, and memory storing reel data defining a plurality of reel strips and a plurality of current feature states. The method comprises controlling the display to display a plurality of feature game indicators that indicate respective ones of the current feature states and a feature game to which the respective ones of the current feature states correspond, selecting, using the random number generator, a defined number of the current feature states to be active for a game instance of a spinning reel game, controlling the display to visually indicate in connection with the feature game indicators, which of the plurality of feature states were selected to be active feature states for the game instance, selecting for the game instance, based on the reel data and using the random number generator, symbols for a plurality of symbol positions, controlling the display to display the selected symbols at the symbol positions, evaluating the selected symbols for winning combinations of symbols, and upon a trigger condition being met in respect of an active feature state, conducting a feature game based on the active feature state in respect of which the trigger condition was met.

Another example embodiment describes a system comprising at least one display, a random number generator, at least one input mechanism operable to input a wager, one or more processors, and memory (i) reel data defining a plurality of reel strips, (ii) a plurality of current feature states, and (iii) instructions. When the instructions are executed by the one or more processors, cause the one or more processors to control the at least one display to display a plurality of feature game indicators that indicate respective ones of the current feature states and a feature game to which the respective ones of the current feature states correspond, select using the random number generator, a defined number of the current feature states to be active for a game instance of a spinning reel game, control the at least one display to visually indicate in connection with the feature game indicators, which of the plurality of feature states were selected to be active feature states for the game instance, select for the game instance, based on the reel data and using the random number generator, symbols for a plurality of symbol positions, control the at least one display to display the selected symbols at the symbol positions, evaluate the selected symbols for winning combinations of symbols, and upon a trigger condition being met in respect of an active feature state, conduct a feature game based on the active feature state in respect of which the trigger condition was met.

BRIEF DESCRIPTION OF THE DRAWINGS

FIG. 3 illustrates an example reel strip layout.

DETAILED DESCRIPTION

Embodiments described herein are generally related to a technique for employing activatable feature states for feature games. In particular, embodiments described herein are directed to randomly selecting a feature state for one or more feature game types visually indicated in a user interface during a spinning reel game. That is, the feature game associated with each visual indication may be associated with multiple feature states which indicate a particular variation of the corresponding feature game.

Embodiments described herein provide a technical improvement by employing additional feature game variations without requiring significant memory or compute resources to handle the additional permutations. In addition, embodiments described herein provide a solution to a technical problem of providing a visual indication of possible permutation by including visual indicators of active feature states for corresponding feature games such that an improved interface is provided for indicating potential outcomes for a game.

Figure 1:
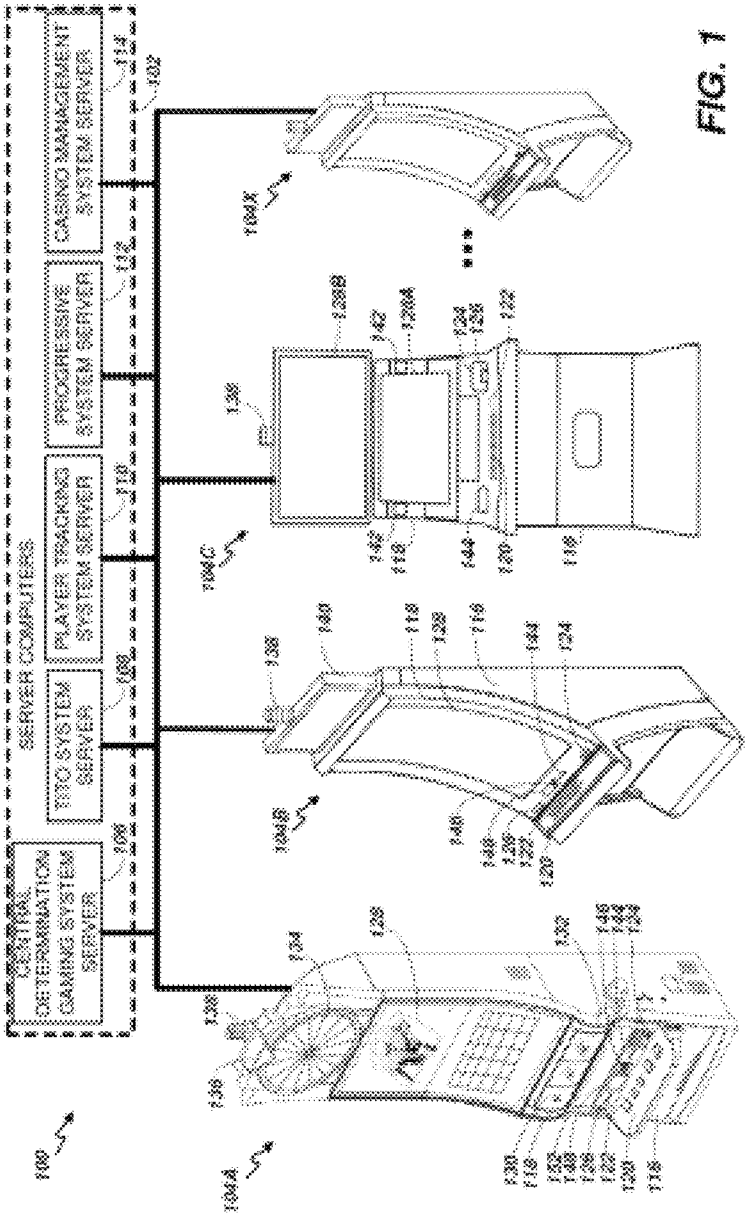
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
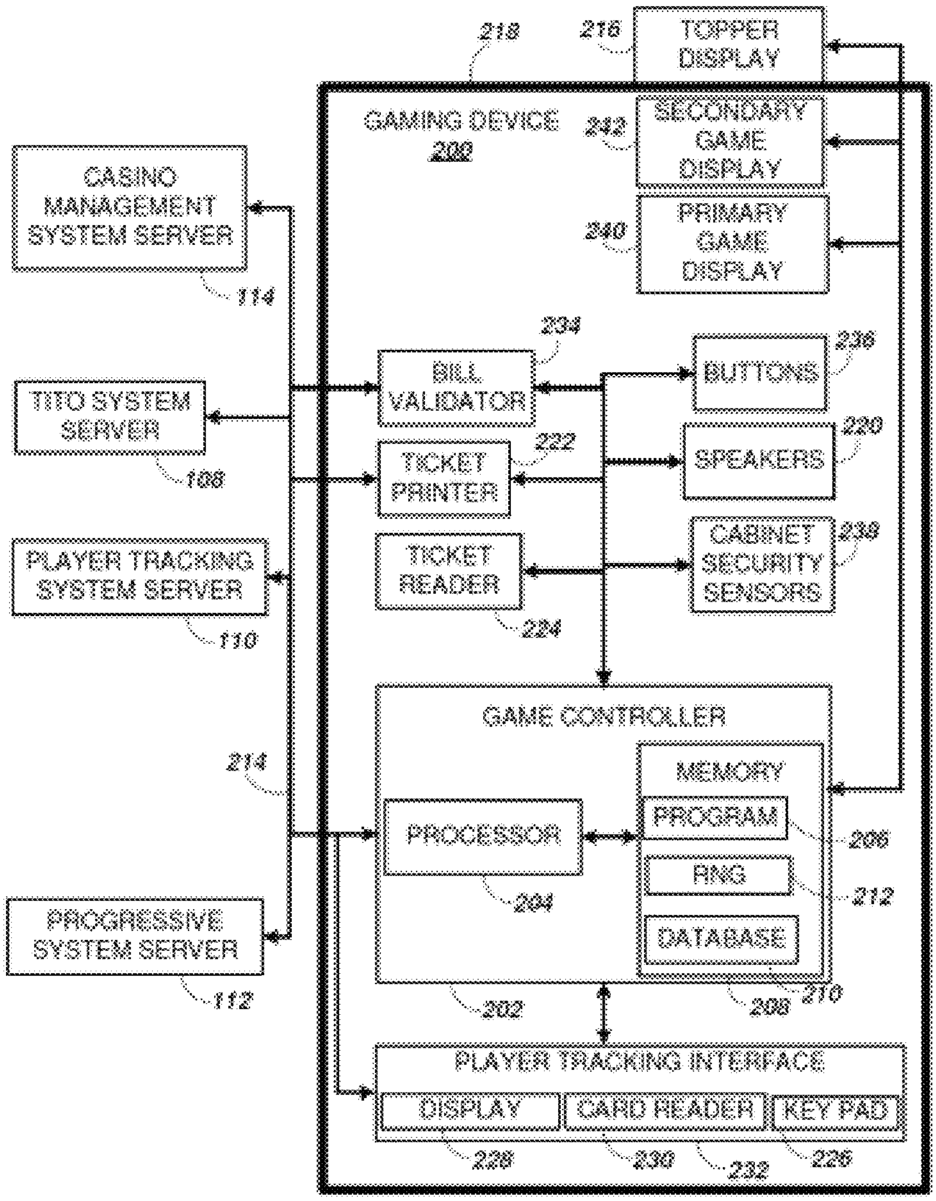
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

The memory 208 may include one or more mass storage devices or media that are housed within gaming device 200. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions, or computer readable code, and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
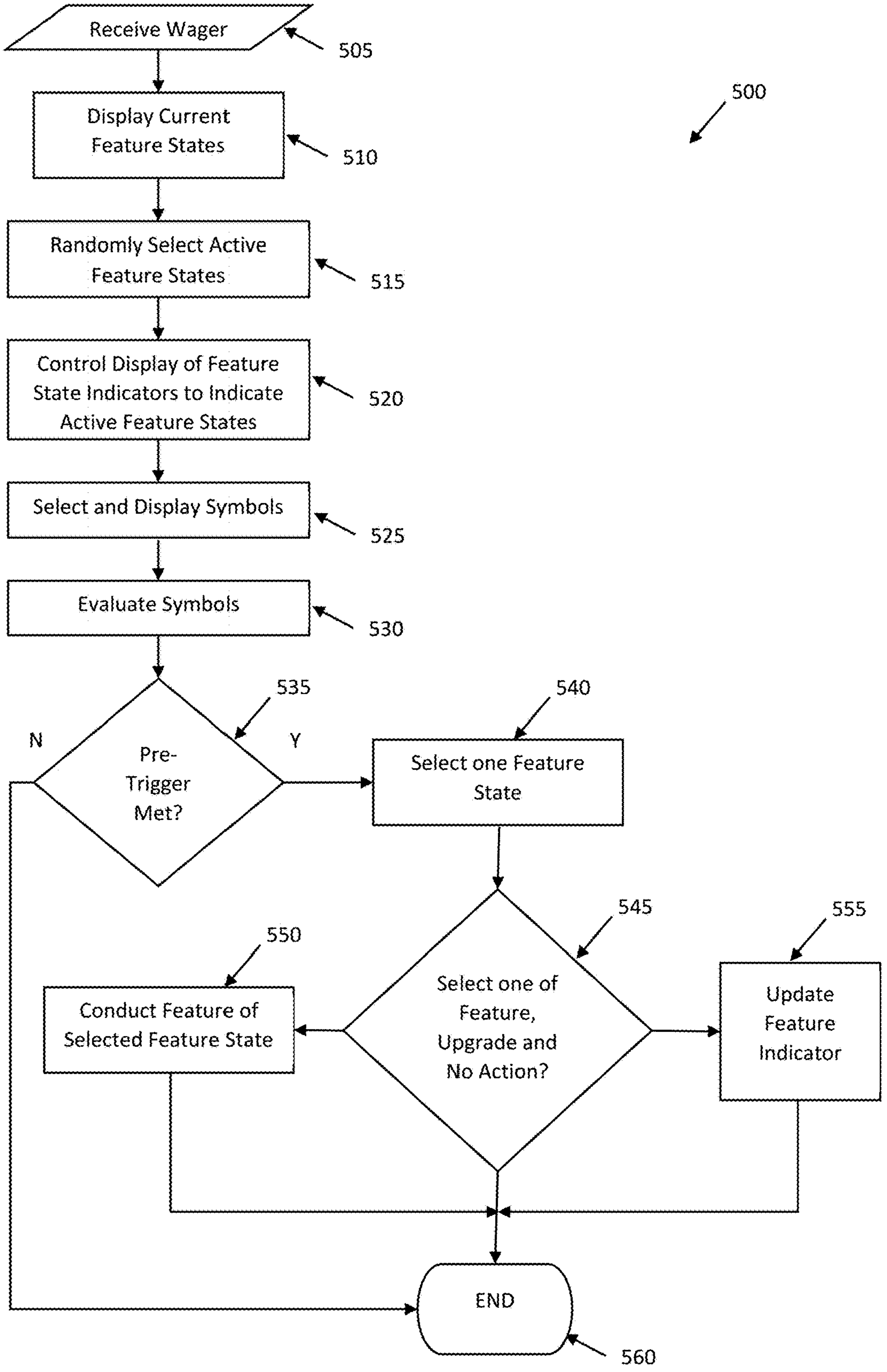
FIG. 5 is a flow chart of a method of operating a gaming device.

FIG. 5 is a flow chart of an example embodiment of a method 500 of operating a gaming device 200. At step 505, the processor 204 receives a wager input by a player using an input mechanism, for example, a virtual button deck—that is a touch screen display that displays virtual buttons that the player can "press" by touching the virtual button deck where one of a plurality of buttons is displayed. In other examples, a physical button deck may be employed or a hybrid button deck having a mixture of virtual and physical buttons. The buttons may include a play button which allows the player to place the same wager again.

Figure 6:
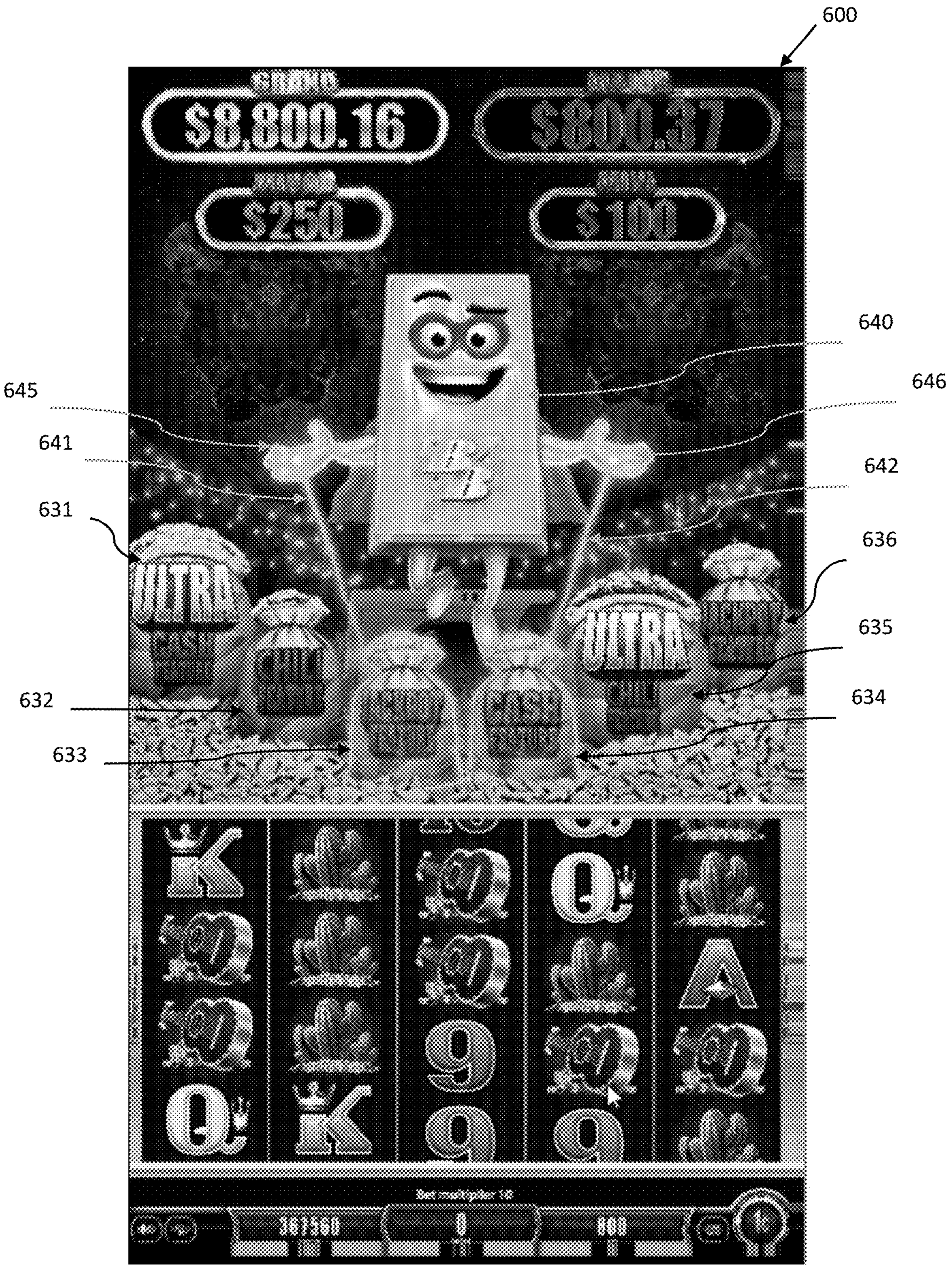
FIGS. 6 to 9 are example screen displays resulting from operating the gaming device.

As shown in the example screen display 600 of FIG. 6, based on the received wager, at step 510, the processor 204 controls the display 240 to display a plurality of feature game indicators 631-635 corresponding to current feature states of a plurality of feature games. In the example, the feature states are dependent on the amount wagered such that if the player changes the wager amount, the feature states change to states stored in memory 208 corresponding to the wager amount.

In the example, of FIG. 6, there are six feature game indicators 631-632 corresponding to two independent instances of current feature states for each of three feature games. In this example, first feature indicator 631 corresponds to the "Cash Feature" and indicates that the current feature state is the "Ultra Cash Feature"—i.e. if the Cash Feature is initiated in connection with this feature indicator 631, the Cash Feature will be conducted, at least initially, in the "Ultra" state. Fourth feature indicator 634 also corresponds to the Cash Feature and indicates that the current feature state is the normal or base feature state. First feature indicator 631 is located on the right side of the "Bolt Bullion" animated character 640 (from the character's perspective) and fourth feature indicator is located on the left side of the animated character 640.

In this example, second feature indicator 632 corresponds to the "Chili Feature" and indicates that the current feature state is the base feature state. Fifth feature indicator 635 also corresponds to the Chili Feature but indicates that the current feature state is the "Ultra Chili Feature"—i.e. if the Chili Feature is initiated in connection with feature indicator 635, the Chili Feature will be conducted, at least initially, in the "Ultra" state. Second feature indicator 632 is located on the right side of the "Bolt Bullion" animated character 640 and fifth feature indicator is located on the left side of the animated character 640.

In this example, third feature indicator 633 corresponds to the "Jackpot Feature" and indicates that the current feature state is the base feature state. Sixth feature indicator 636 also corresponds to the Jackpot Feature and also indicates that the current feature state is the base feature state. Second feature indicator 632 is located on the right side of the "Bolt Bullion" animated character 640 and fifth feature indicator is located on the left side of the animated character 640.

In this example, the available feature states are a sequential series of states which in order from lowest to highest are the base or "normal" feature state, a super feature state, a mega feature state and an ultra feature state. These states correspond to game play characteristics of their respective feature game arranged such that they provide incremental benefits in the order of the sequence, in this example, resulting in incremental increases in expected return to player when the respective feature game is conducted.

At step 515, the processor 204 randomly selects a defined number of active feature states using a true or pseudo random number generator (RNG) 212. In this example, in each base game instance, the processor 204 randomly selects two feature states (such that two feature indicators are also selected), one located to the right and one located to the left of the "Bolt Bullion" animated character 640 (from the perspective of the character 640. The feature states may be selected from one or more feature state data structures stored in memory comprising a plurality of feature states. Each of the plurality of feature states may be associated with one or more feature games. It will be observed that as a result, the feature states selected to be active can correspond to the same or different feature games. In this example, the processor 204 performs two independent random selections from two groups of the feature states: a first group corresponding to the first to third feature indicators 631-633; and a second group corresponding to the fourth to sixth feature indicators 634-636. In this example, each feature state of each group of feature states has an even chance of being selected. Accordingly, ranges of values returnable by the RNG 212 are evenly allocated to each feature state, the processor 204 obtains a value from the RNG 212 and maps it to one of the first to third feature states and then repeat the process for the fourth to sixth feature states. Other random selection techniques can be used. For example, processor 204 could make a single selection from all of the possible combinations of first to third feature states with fourth to sixth feature states.

At step 520, the processor 204 controls the display to visually indicate in connection with the feature game indicators 631-636 which of the feature states are active. In this example, selection indicators 641, 642 in the form of lightning animations extending from animated character's right 645 and left 646 hands to, and surrounding, the feature indicators of the feature states selected to be active, in this example, Jackpot Feature indicator 633 and Cash Feature indicator 634 in order to highlight them.

Figure 7:
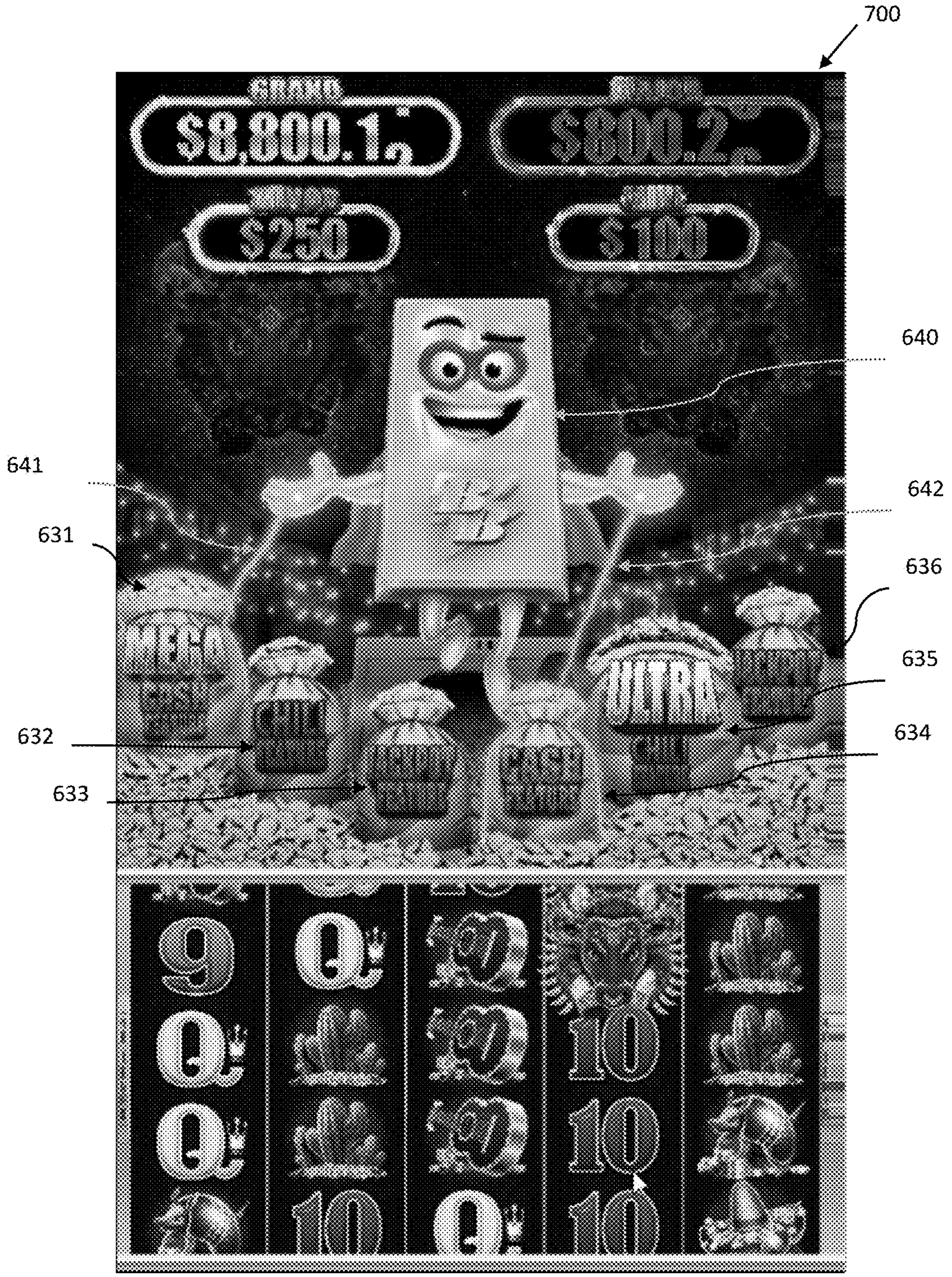

In this example, each feature state is independent so that the two feature states selected to be active can be for different feature games as shown in the example screen display of FIG. 6 or for the same feature game as shown in the example screen display 700 of FIG. 7 where selection indicators 641,642 are connected to the feature game indicators 631,634 for the Cash Feature. In this example, feature game indicator 631 indicates a "Mega" state of the Cash Feature and feature game indicator 634 indicates a base state of the Cash Feature.

In other examples, a different number of feature states can be selected. This could include a single feature state but an advantage of selecting two or more feature states is that a further selection can be made as described in further detail below. In alternative examples, the probabilities of selecting feature states may be unevenly weighted. Further, feature indicators may be displayed in different positions and their selection indicated using alternative animations. Still further, it will be appreciated that the exemplified animated character 640, having two hands, lends itself to a right hand and left hand selection, that is to a selection where one feature state is selected from the right side of animated character 640 and one from the left side. In other examples, graphic design elements may be designed to be suitable for selections that are independent of the position of the feature game indicator. Still further, it is possible for there to be different numbers of feature indicators and for them to relate to fewer or more feature games than in the example.

At step 525, the processor 204 selects symbols for the current game instance and controls the display 240 to display the selected symbols. FIG. 3 illustrates an example reel strip data structure having a set 300 of five reel strips 341, 342, 343, 344, 345. In the example, for illustrative purposes, twenty-five reel strip positions 301-325 are shown for each reel strip 341-345. In this example, each reel strip position of each reel has a symbol. In other examples, there may be one or more blank symbol positions. For example, a "Wild" symbol occupies the seventeenth reel strip position 317 of the fourth reel strip 344. The symbols shown on the reel strips 341-345 are generally indicative of symbols that may be employed in other embodiments, however, other reels strips to those illustrated in FIG. 3 can be used. Symbol position 330 indicates that the reel strips 341-345 will typically have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

Figure 4:
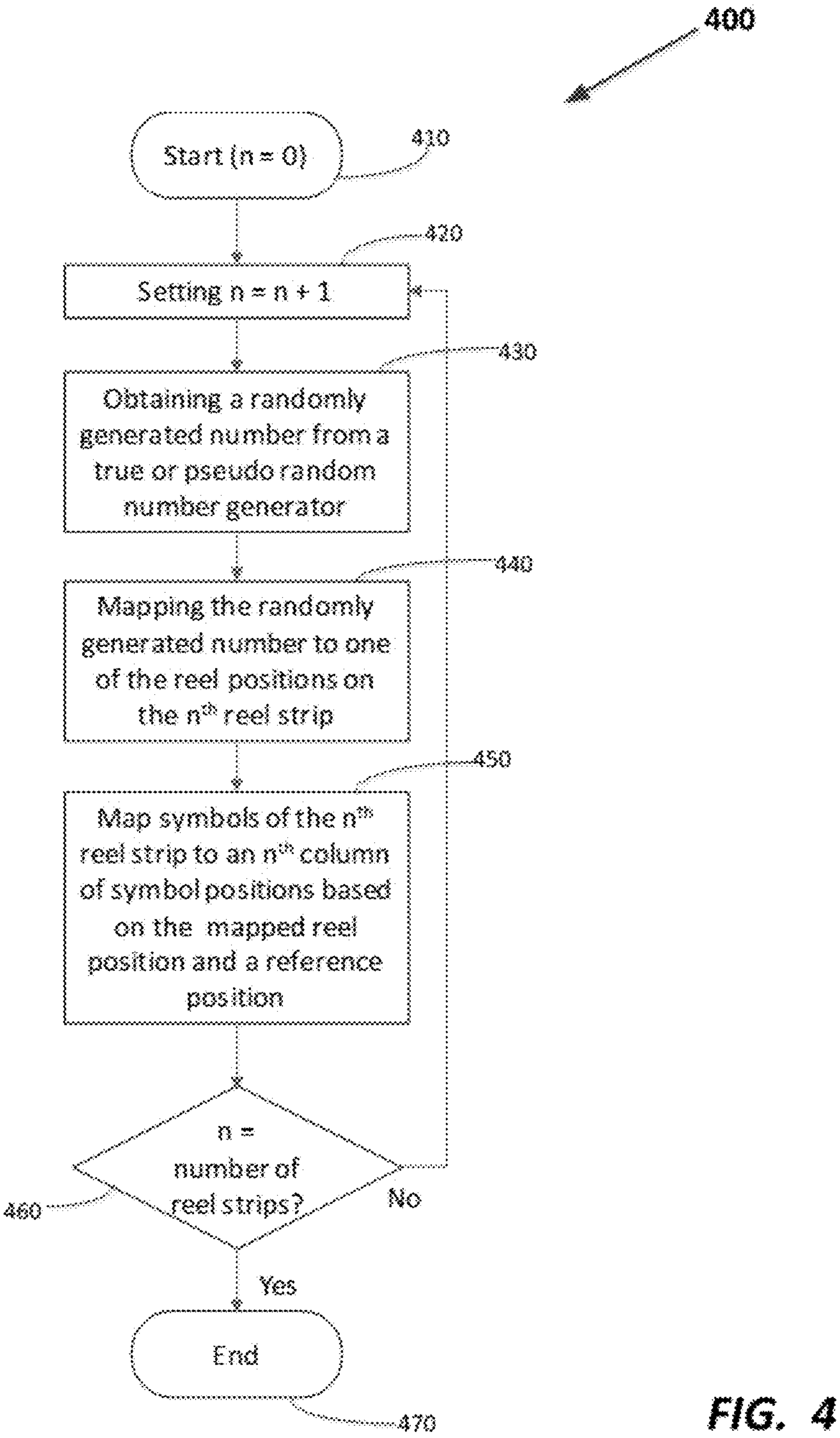
FIG. 4 is a flow chart of a symbol selection method.

FIG. 4 is a flow chart of an example method 400 carried out by the processor 204 to select symbols from reel strips 341-345 at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when four symbols are being selected for the first column of symbol positions, then for the first reel strip 341, "10" is mapped to a bottom symbol position and the three symbols immediately above it (here "PIC3", "A", and 9") are mapped to the symbol positions above the symbol position while preserving the reel strip order of the first reel strip. For the columns of symbol positions that change, the number of symbols mapped depends on the current symbol position state such that each time the number of active symbol positions increases by one for a column, an additional symbol position is mapped for that column.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. It will be appreciated that in other examples, there may different numbers of symbol positions. Indeed, in some of the examples described below, the number of symbol positions in the columns varies depending on the state of the game.

After the symbols of all reel strips have been mapped to symbol position, the processor 204 controls display 240 to display them at the symbol positions. For example, as shown in the example screen display of FIG. 8, symbols of the five reel strips are mapped to five columns 821-825 of four symbol positions such that there are also four rows 811-814 of symbol positions.

At step 530, the processor 204 evaluates the selected symbols, in this example, based on a set of defined win lines and a pay table stored in memory 208.

At step 535, the processor 204 determines whether a pre-trigger condition is met, in this example, that the selected symbols include at least one defined symbol. In other examples, the pre-trigger condition could be a separate random determination by the processor 204 or that the selected symbols include a defined combination of symbols. In this example, the defined symbol is the wild symbol.

Figure 8:
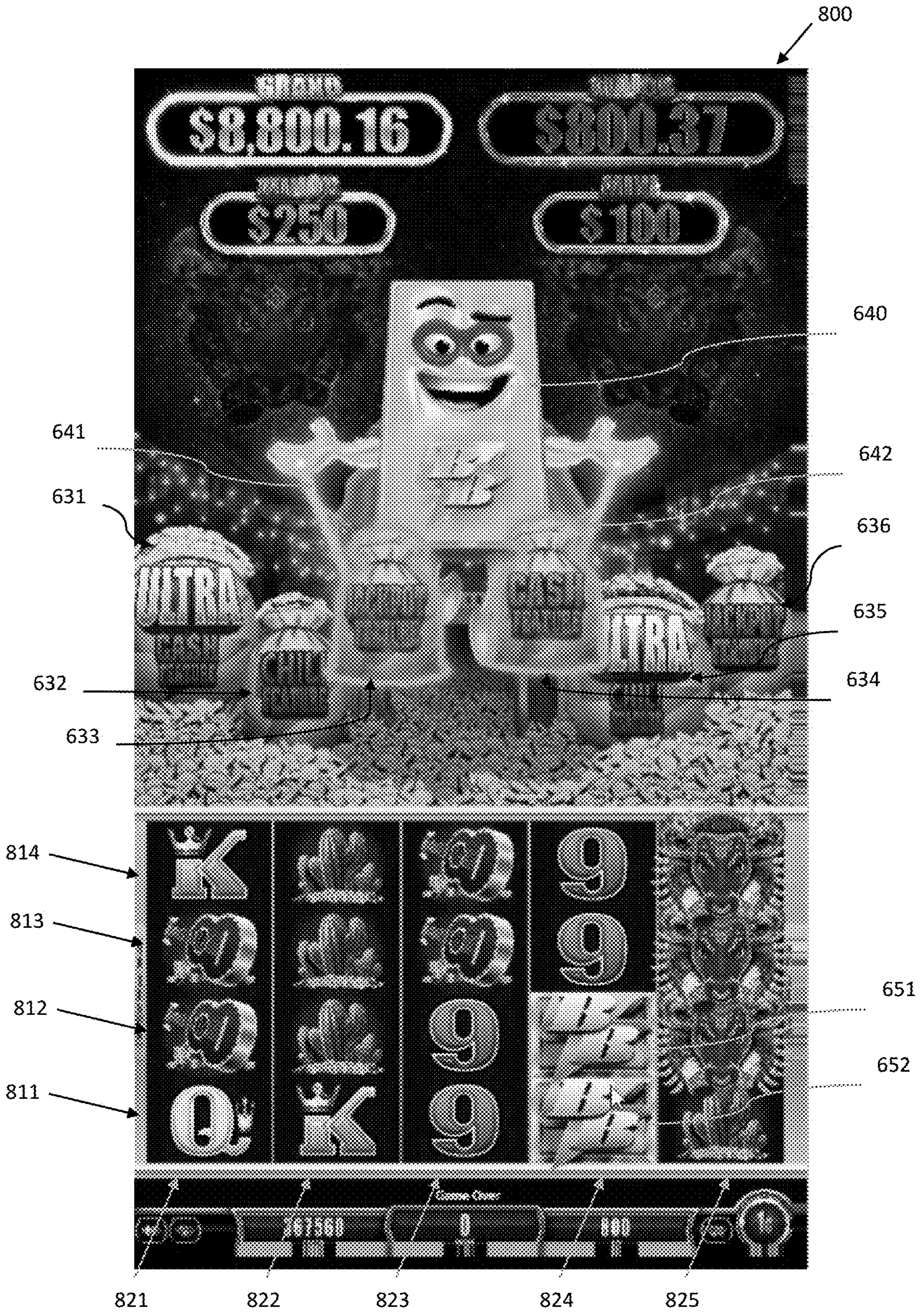

When one or more wild symbols 651,652 are selected, as shown in example screen display 800 of FIG. 8, the feature indicators 633,634 of the active feature states are animated by processor 204 on display 240 as being lifted by animated character 640 using the lightning animations 641,642 to visually indicate to the player that the processor 204 will conduct additional processing in response to the selection of the wild symbols 651,652.

At step 540, the processor 540 randomly selects one of the two feature states using the random number generator 212. That is, in the example of FIG. 8, either the Jackpot Feature state corresponding to feature indicator 633 or the Cash Feature state corresponding to feature indicator 644 will be selected. In the example, the random selection is configured so that there is an equal probability of either feature state being selected.

At step 545, the processor 204 conducts a random determination using RNG 212 in respect of the selected feature state using a weighted table stored in memory 208 in order to determine whether to trigger the feature game corresponding to the selected feature state, upgrade the feature state, or undertake no action (i.e. not trigger or upgrade the selected feature). In an example, the weighted table is specific to the current feature state, so that, for example, the probability of the feature state being upgraded depends on the current feature state and is zero when the feature state is the highest state. As shown in FIG. 5, the possible outcomes of step 545, are the feature game corresponding to the selected active feature state being conducted at step 550, the feature state being upgraded at step 555 in conjunction with the feature indicator being updated, or no action in which case the game instance ends at step 560. In this example, a single random determination is conducted by the processor 204 in response to one or more wild (designated) symbols being selected. In other examples, separate random determinations could be performed for each wild symbol.

Persons skilled in the art will appreciate that the values in these weighted table (and indeed in other weighted tables described herein) are chosen in order to control the relative return to player of different feature states. For example, the rate at which features trigger and the rate at which features upgrade will both impact on the amount of return to player provided by the highest feature state.

Figure 9:
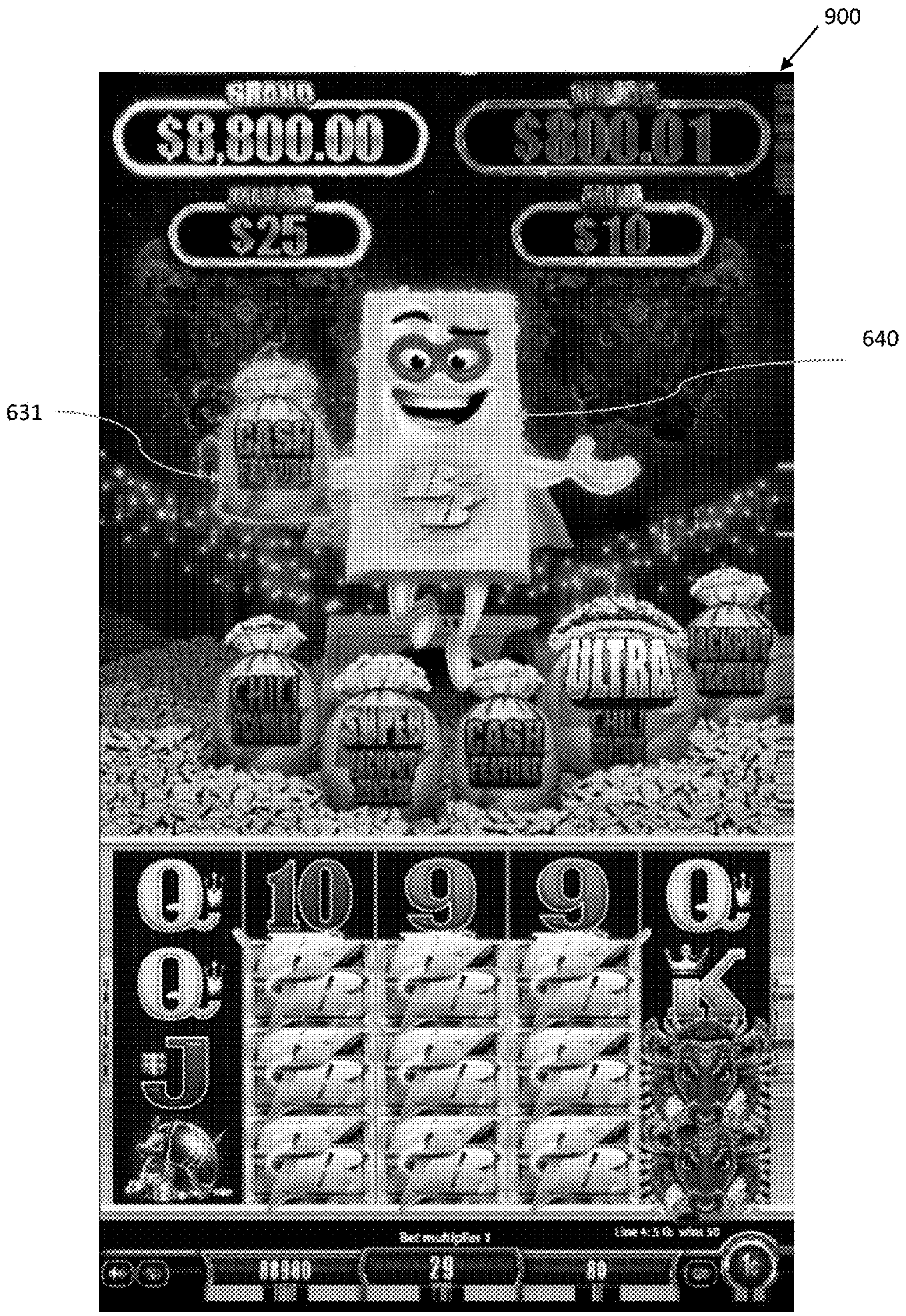

FIG. 9 is an example screen display 900 where the outcome of step 545 is that the processor determines to conduct the Cash Feature at step 555. In FIG. 9, animated character 640, holds only the Cash Feature feature indicator 631. As will be observed with a comparison to FIG. 8, animated character 640 is displayed as holding the feature indicator 631 higher to give the impression that the animated character has picked up or grabbed feature indicator 631 to thereby provide a visual prompt that the Cash Feature will be conducted.

Figure 10:
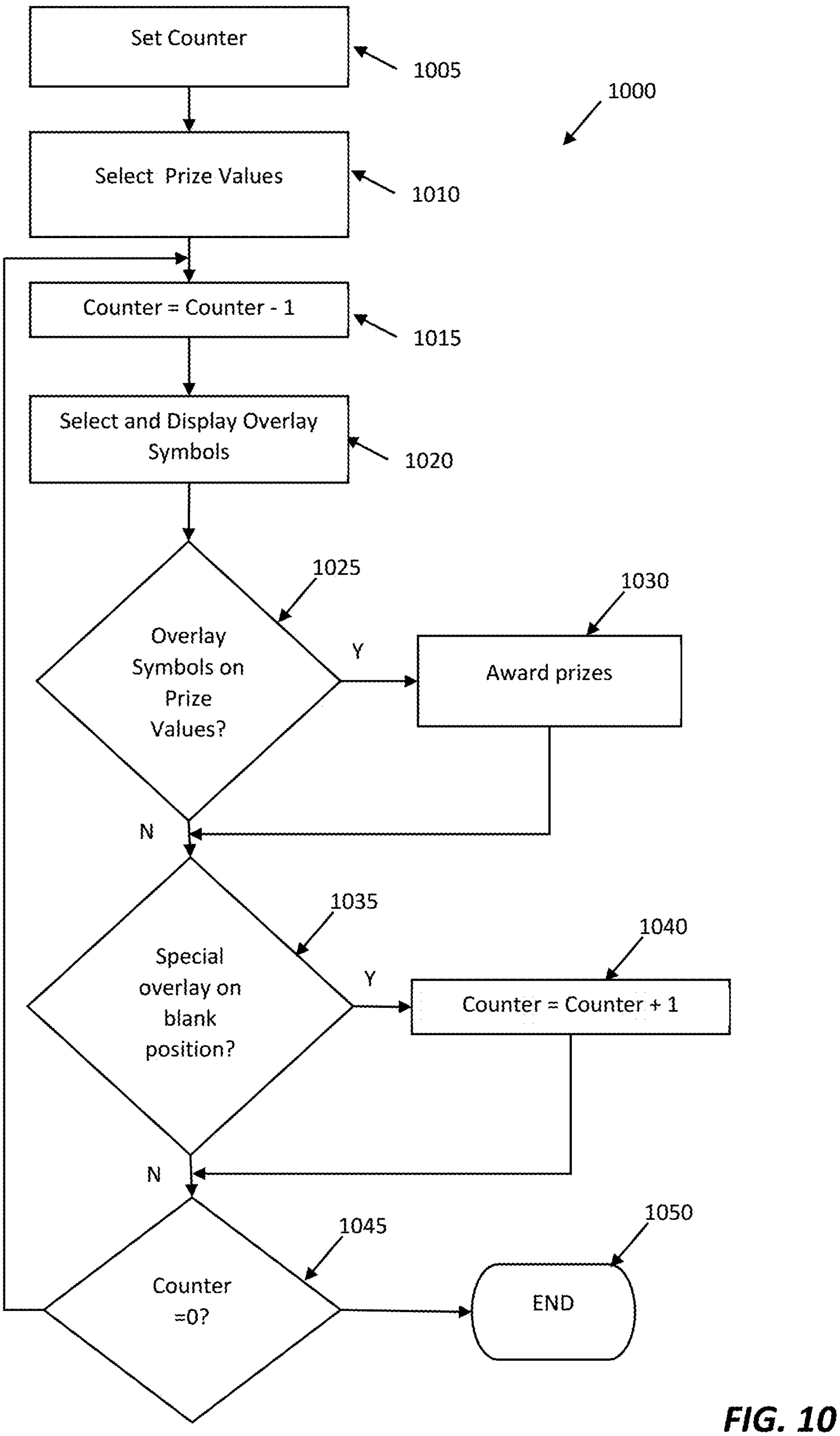
FIG. 10 is a flow chart of another method of operating a gaming device.
Figure 11:
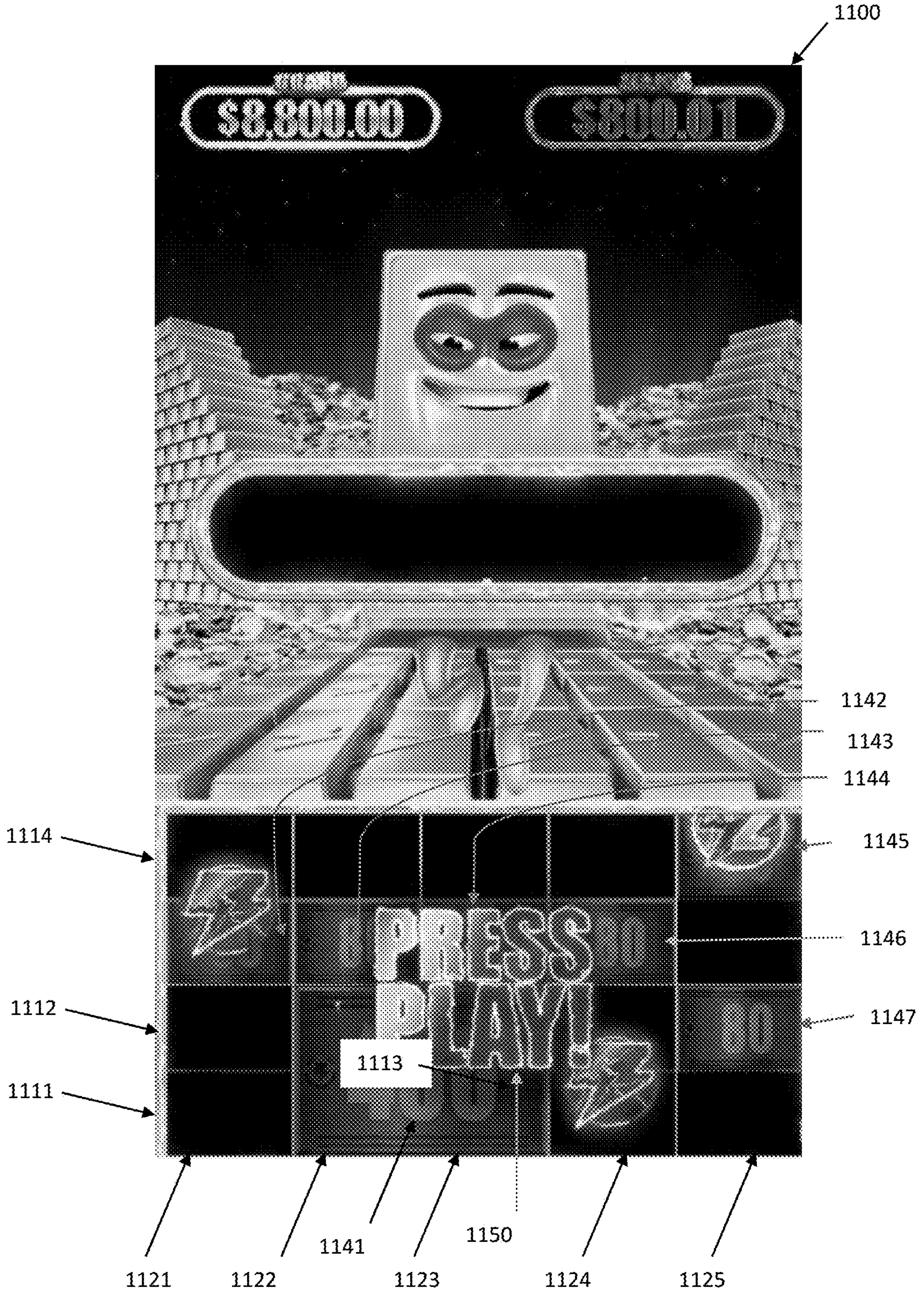
FIGS. 11 to 19 are example screen displays resulting from operating the gaming device.

FIG. 10 is a flow chart 1000 of an example embodiment of conducting the Cash Feature feature game in the base game state. At step 1010, the processor 204 sets a counter in memory 208 to an initial number of feature game instances, in this example three feature game instances. At step 1010, the processor 204 selects prize values to apply for the feature game instances. In the example, the selected prize values apply for all instances of the feature game. In other examples, prize values could be selected for each game instance. In the example, prize values are selected in respect of an array of 20 symbol positions arranged in four columns 1121-1125 and four rows 1111-1114 as shown in FIG. 11. In the example, selection of the prize values is constrained so that one oversized prize symbol will be selected in each feature game. In this respect, an oversized prize symbol is one that will be displayed as occupying multiple symbol positions. In this example, the oversized symbols will either occupy 2×2 or 3×3 symbol positions but other oversized symbols are possible, e.g. 2×3, 4×4. Further, in other embodiments there may be no oversized symbol or it may be randomly determined whether there will be an oversized symbol.

In the present example, processor 204 first selects whether the feature game will have a 2×2 or a 3×3 oversized prize symbol using a weighted table in memory 208 and random number generator 2112. Next processor 204 determines a total number of symbol positions of the 20 symbol positions to be occupied by prize values such that a number of single symbol positions will be the selected total number of symbol positions less the number of positions occupied by the oversized prize symbol. Again processor 204 uses random number generator 212 and a weighted table in memory 308 to determine the total number of symbol positions. Processor 204 then randomly selects a position for the oversized prize symbol by selecting from a set of eligible ones of the symbols positions configured such that the oversized prize symbol will map to the symbol positions. Processor 204 randomly selects symbol positions for the remaining prize symbols (i.e. those to occupy symbol positions). Processor 204 also uses random number generator 204 to select a prize value for the oversized prize symbol using a weighted table in memory 208. In an example, the prize values are expressed in the weighted table as multiples of a wager amount so that they will scale with the amount wagered. In this example, the prize values of the single position symbols are a fixed multiple of the wager amount. In another example, separate weighted tables are used for the oversized prize symbol and the single position prize symbols such that the single position symbols can have different prize values to one another. In the example, the weighted table used may depend on the state of the Cash Feature.

FIG. 11 shows an example screen display 1100 at the conclusion of the process of selecting prize positions and values but prior to the player initiating the feature game (as indicated by "Press Play!" game message 1150) for an example where the above selection process has resulted in 10 symbol positions being occupied by prize values including a 2×2 oversized prize symbol 1141 of 400 credits and six single position prize symbols 1142-1147 of 80 credits. The remaining symbol positions are left blank.

At step 1015, processor 204 decrements the counter by one to reflect the initiation of a spinning reel game instance.

At step 1020, processor 204 selects overlay symbols (that is, symbols that will overlay the prize symbols or blank symbol positions once selected). In this respect, the process for selecting symbols is generally the same as that outlined above in relation to FIG. 4 with the processor 204 selecting stopping positions for each reel but the set of reels strips is different. For example, the reel strips may be stored in a data structure that takes the form set out in Table 1 below.

TABLE 1

| Pos. | Reel 1 | Reel 2 | Reel 3 | Reel 4 | Reel 5 |
|---|---|---|---|---|---|
| 1 | RED BOLT | BLANK | BLANK | BLANK | BLANK |

TABLE 1-continued

| Pos. | Reel 1 | Reel 2 | Reel 3 | Reel 4 | Reel 5 |
|---|---|---|---|---|---|
| 2 | BLANK | MYSTERY | BLANK | BLANK | BLANK |
| 3 | BLANK | BLANK | BLANK | RED BOLT | BLANK |
| 4 | BLANK | BLANK | MYSTERY | BLANK | BLANK |
| 5 | BLANK | BLANK | BLANK | BLANK | MYSTERY |
| 6 | MYSTERY | BLANK | BLANK | BLANK | BLANK |
| 7 | BLANK | RED BOLT | BLANK | BLANK | BLANK |
| 8 | BLANK | BLANK | BLANK | MYSTERY | BLANK |
| 9 | BLANK | BLANK | RED BOLT | BLANK | BLANK |
| 10 | BLANK | BLANK | BLANK | BLANK | RED BOLT |

In Table 1, each reel has a "Mystery" symbol. This is a symbol that will be configured in each game instance by the processor 204 to be either a blank symbol, a "Red Bolt" (a "normal" overlay symbol) or a "Purple Bolt" (a "special" overlay symbol) that incorporates a multiplier symbol selected from a 2×, 3×, 5, or 10× multiplier, wherein the selections are made by processor 204 using at least one weighted table stored in memory 208. As will explained in further detail below, if an overlay symbol is selected for a position occupied by a prize symbol, the processor 204 awards that prize whereas if an overlay symbol is selected for a position occupied by a blank symbol, this does not result in a prize award. In an example, the configuration process is arranged so that no more than one reel has a "Purple Bolt". It will be appreciated that the reel strips together with the processes for configuring them constitute reel data stored in memory 208 that define the reel strips.

Figure 12:
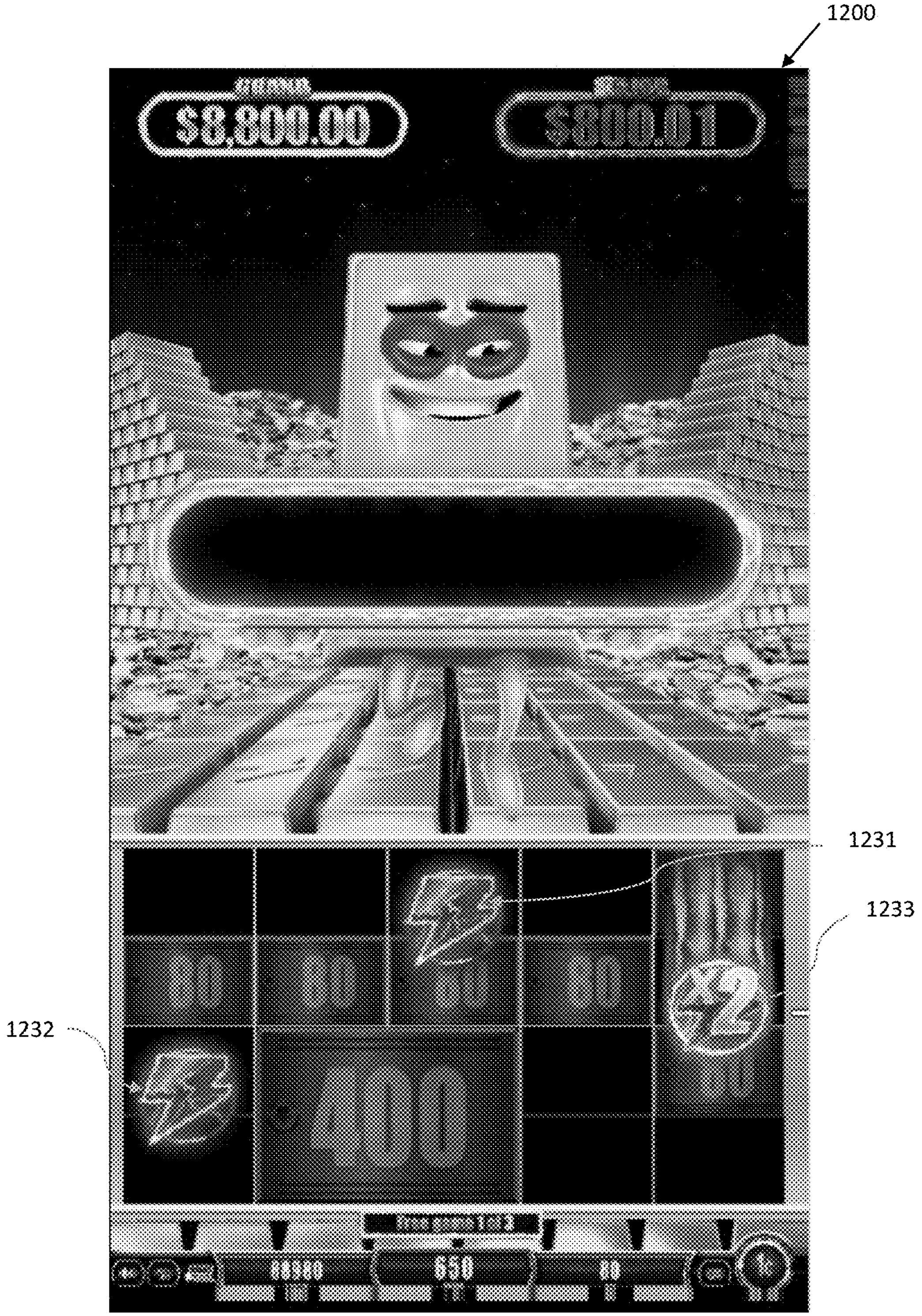

FIGS. 11 and 12 show that the processor 204 animates the reel strips with overlay symbols as spinning relative to the prize symbols such that, in the example of screen display 1200 of FIG. 12, the processor 204 controls the display 240 to show two Red Bolt symbols 1231, and one Purple Bolt symbol with a ×2 multiplier 1232 passing over the prize symbols. The processor 204 then controls the overlay reels to spin to the selected stopping positions as shown in example screen display 1300 of FIG. 13. During this process, processor 204 controls the display to show the reel strips spinning on top of the prize value symbols such that (i) each respective prize value symbol is entirely visible when only blank symbols are in register with the respective prize value symbol, and (ii) each respective prize value symbol is at least partially obscured when at least one overlay symbol is in register with the respective prize value symbol.

Figure 13:
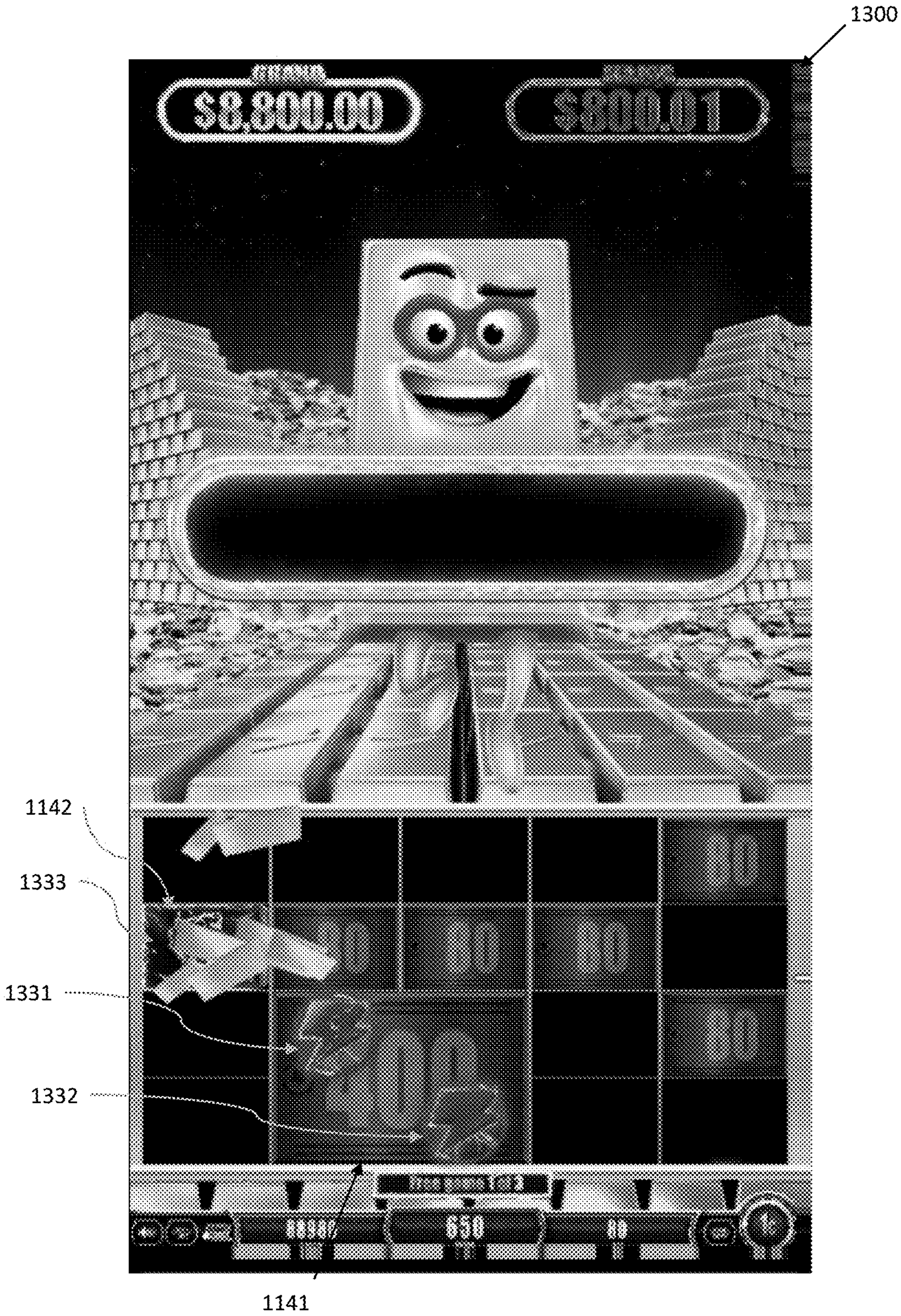
Figure 14:
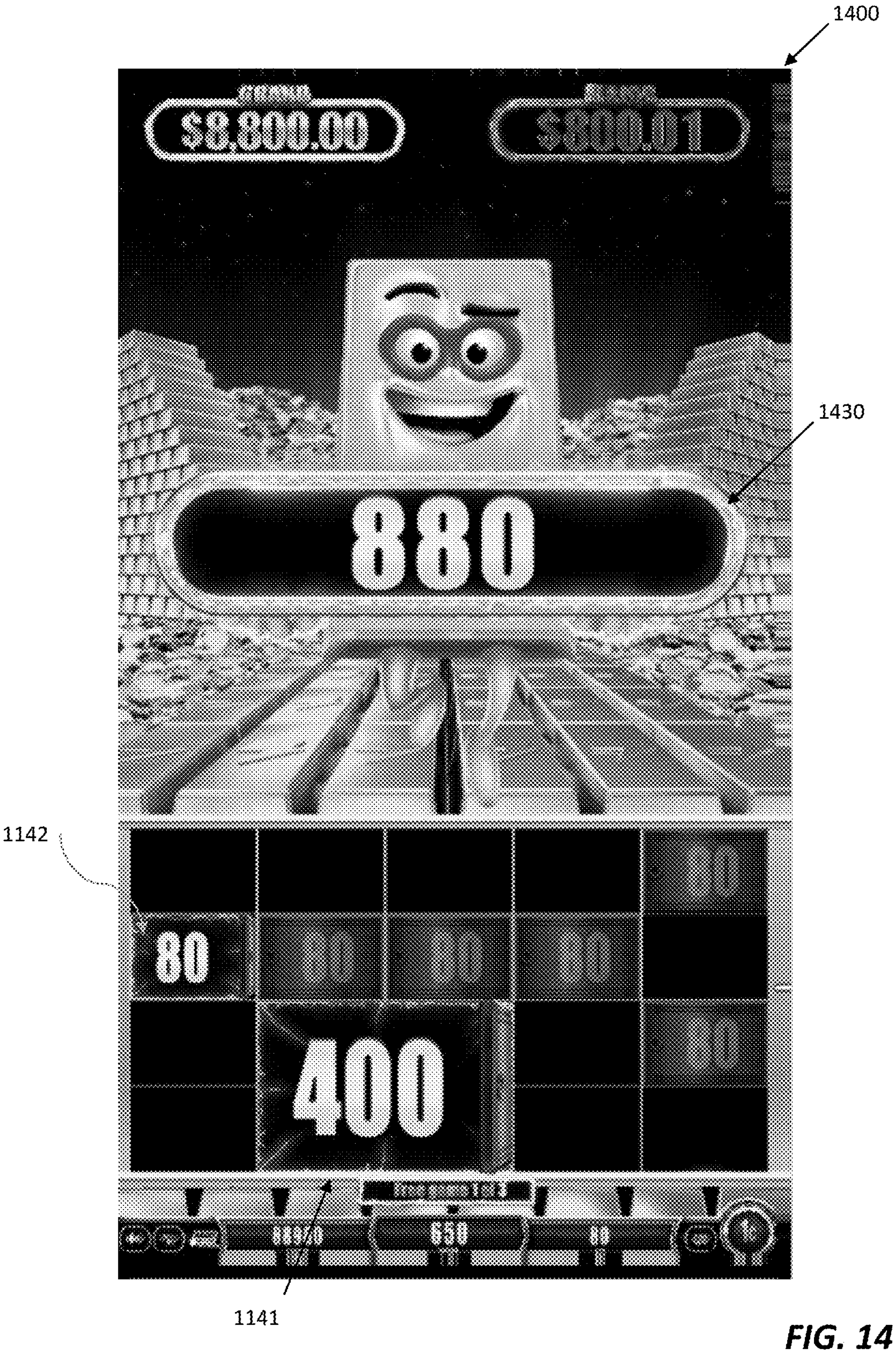

At step 1025, processor 204 determines whether any overlay symbols are in register with a prize symbol at the stopping positions of the overlay reels so that the overlay symbol appears to be on the prize value symbol. If there are one or more such overlay symbols, the processor 204 awards the prizes shown on the prize value symbols at step 1030. In the example of FIG. 13, Red Bolt symbols 1331-133 land on prize symbols 1141, 1142 resulting in an award of 80 credits for prize symbol 1142 and two awards of 400 credits for prize symbol 1141. In this respect, it will be appreciated that for the purposes of awarding a prize in respect of an oversized prize symbol, each symbol position it occupies is evaluated independently by processor 204, such that the oversized prize symbol is equivalent to the same prize amount shown on the oversized prize symbol being at each symbol position. (Note in FIG. 13, landing of Red Bolt symbol 1333 has caused an award animation to be displayed by processor 204.) FIG. 14 shows an example of the total prize award display 1430 being at a value of 880 credits following step 1030.

At step 1035, processor 204 determines whether a special overlay symbol (in this example a Purple Bolt symbol) has been selected to overlay a blank position and, if so, increments the counter by one at step 1040 (that is, awards an additional game instance).

Figure 15:
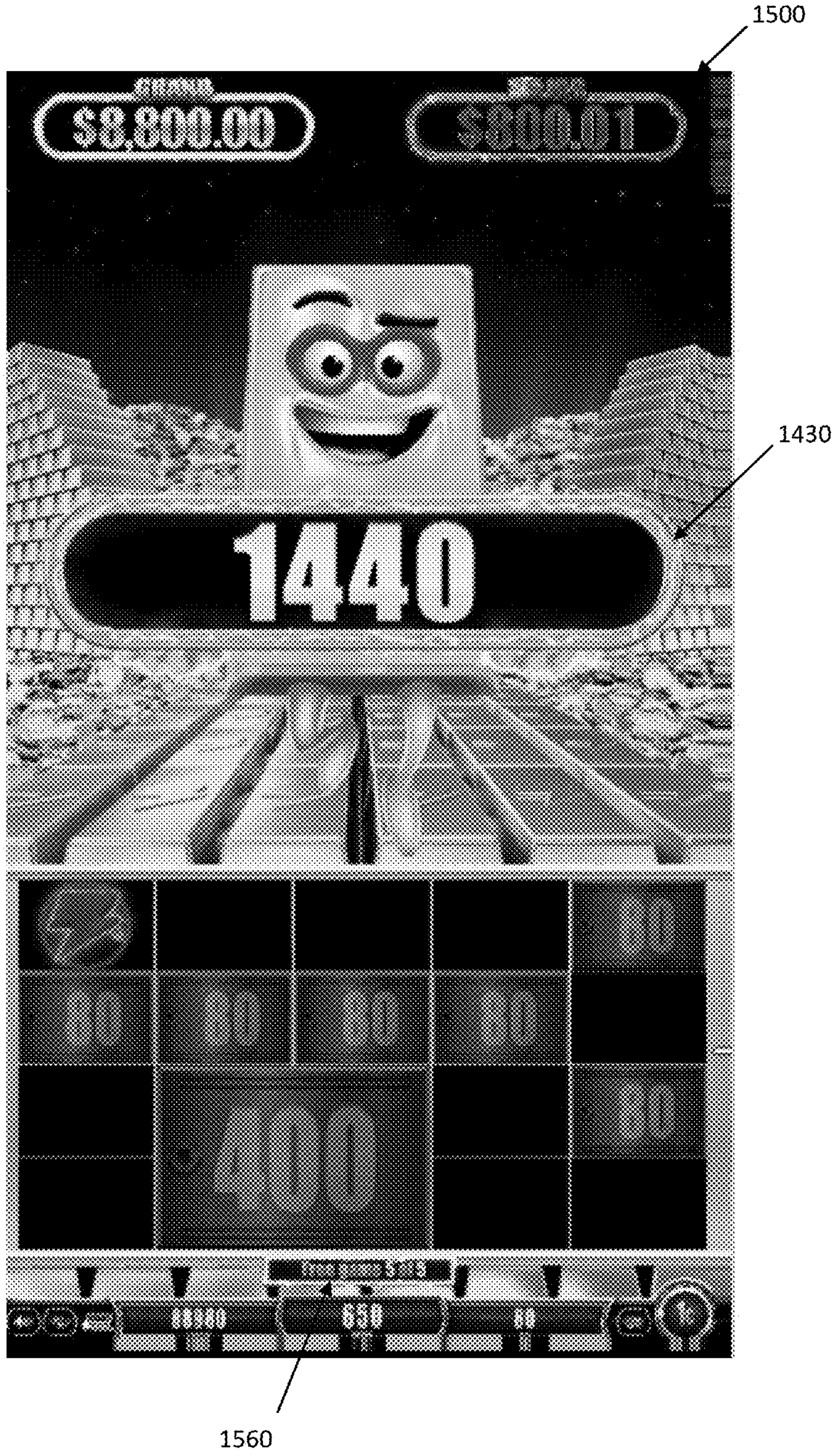

At step 1045, processor 204 determines if the counter has reached zero, and if not reverts to step 1015. When the counter reaches zero, the feature ends at step 1050. FIG. 15 is an example screen display at the end of the feature where the total prize award display 1430 is at a value of 1440 credits and free game counter graphic 1560 shows that five free games have been conducted. This reflects an example where two additional free games were awarded during the course of the feature game by the processor 204 at step 1040.

Figure 16:
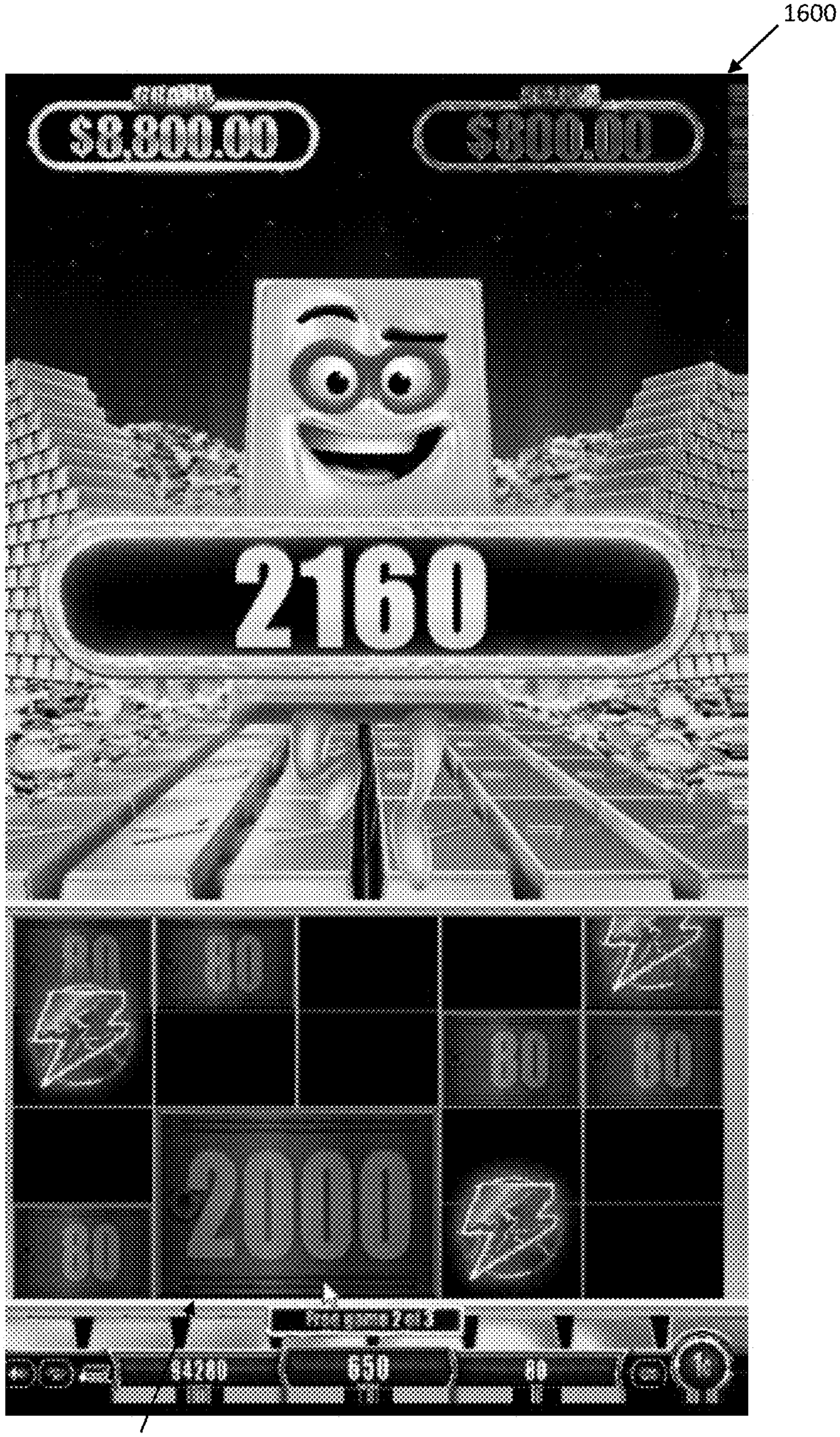

FIG. 16 is an example screen display 1600 where alternative prize values were selected at step 1010. It will be observed that in this example, the oversize prize symbol 1641 has a much larger value of 2000 credits than in the example described above.

As described above, there are a number of different feature states for the Cash Feature. In the example, of the Cash Feature, the different feature states determine a number of game windows that will be active during the feature game. As shown above, there is one active window in the base or normal state. In the "Super" feature state, two windows are awarded; four windows are awarded in the "Mega" feature state, and eight windows are awarded and in "Ultra" feature state.

Figure 17:
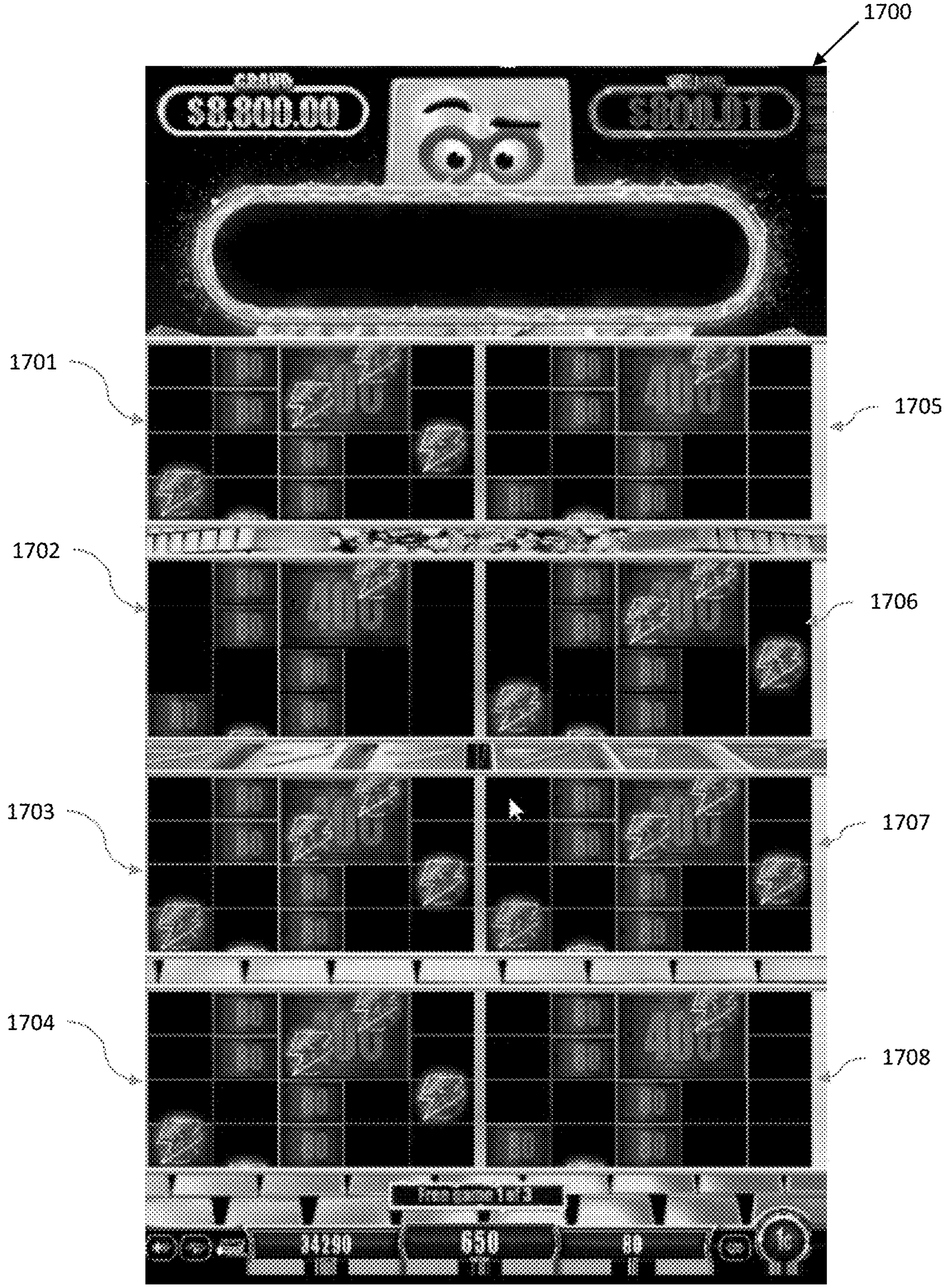
Figure 18:
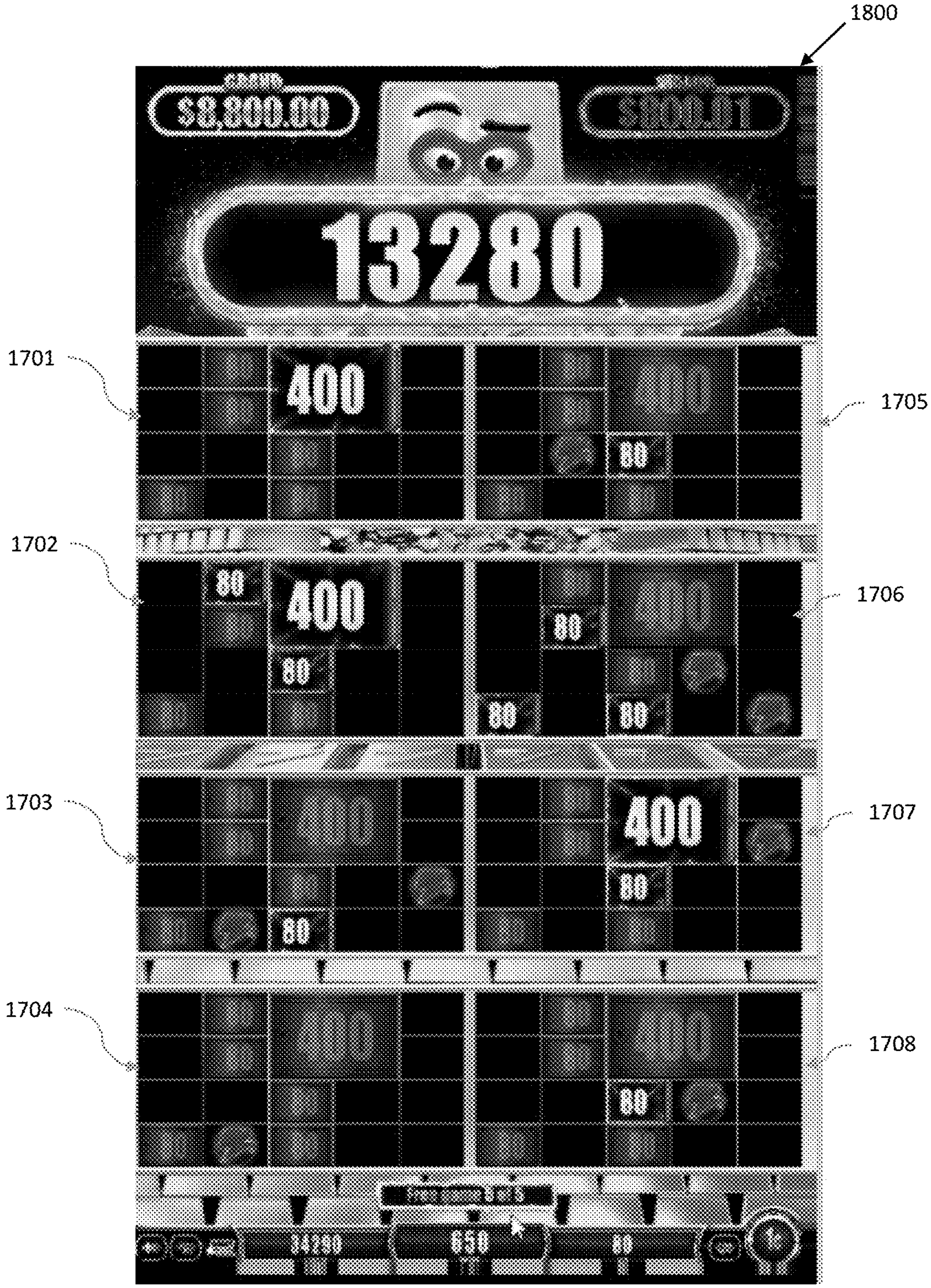

FIG. 17 is an example screen display 1700 of the Cash Feature being conducted in the "Ultra" feature state with eight active game windows 1701-1708. It will be observed that each game window has the same selection and arrangement of prize symbols at symbol positions. In other examples, the processor 204 selects prize value symbols independently for each active game window 1701-1708. Accordingly, it will be appreciated that in the illustrated example, a modified version of the process 1000 of FIG. 10 is conducted by the processor 204 for the "Ultra" feature state in that step 1010 is only conducted once while steps 1020 to 1040 are conducted by processor 204 for each game window so that independent selections of overlay symbols are made for each window and these are independently evaluated by processor 204 to determine whether to award prizes at step 1030. The effect of this independent selection is most easily observed in the game outcomes. In this respect, an example outcome of this process is shown in the example screen display 1800 of FIG. 18 which corresponds to the outcome of a fifth feature game instance generated by processor 204. It will be observed that the game windows 1701-1708 have different outcomes. For example, first window 1701 has an award of 400 credits, sixth window has three awards of 80 credits and fourth window 1704 has no award.

Figure 19:
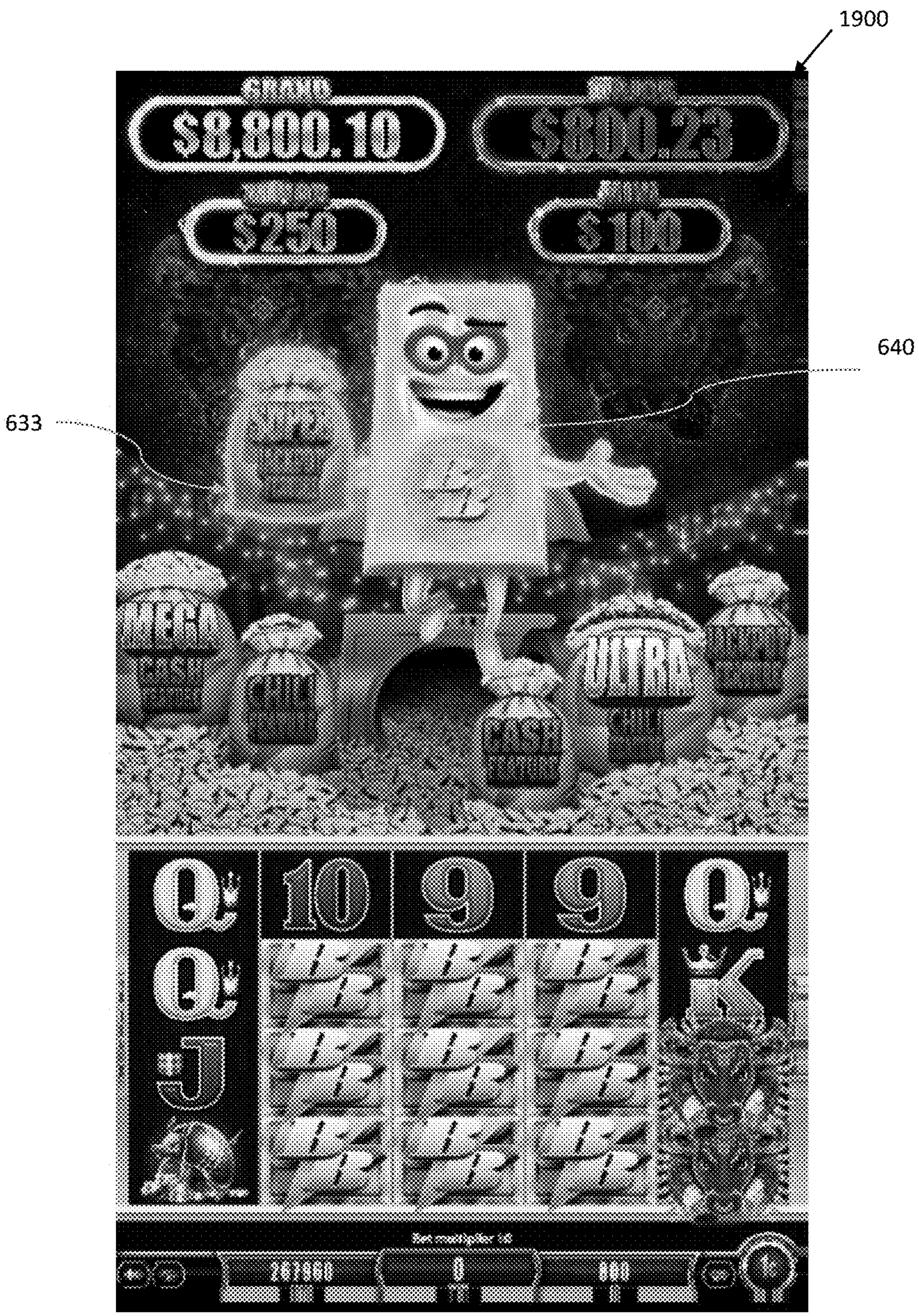

FIG. 19 shows an example screen display where execution of instructions in memory 208 has caused the processor 204 to trigger a "Super Jackpot Feature" as visually indicated in FIG. 19 by animated character 640 picking up third feature game indicator 633 which is currently indicating the Super Jackpot Feature.

Figure 20:
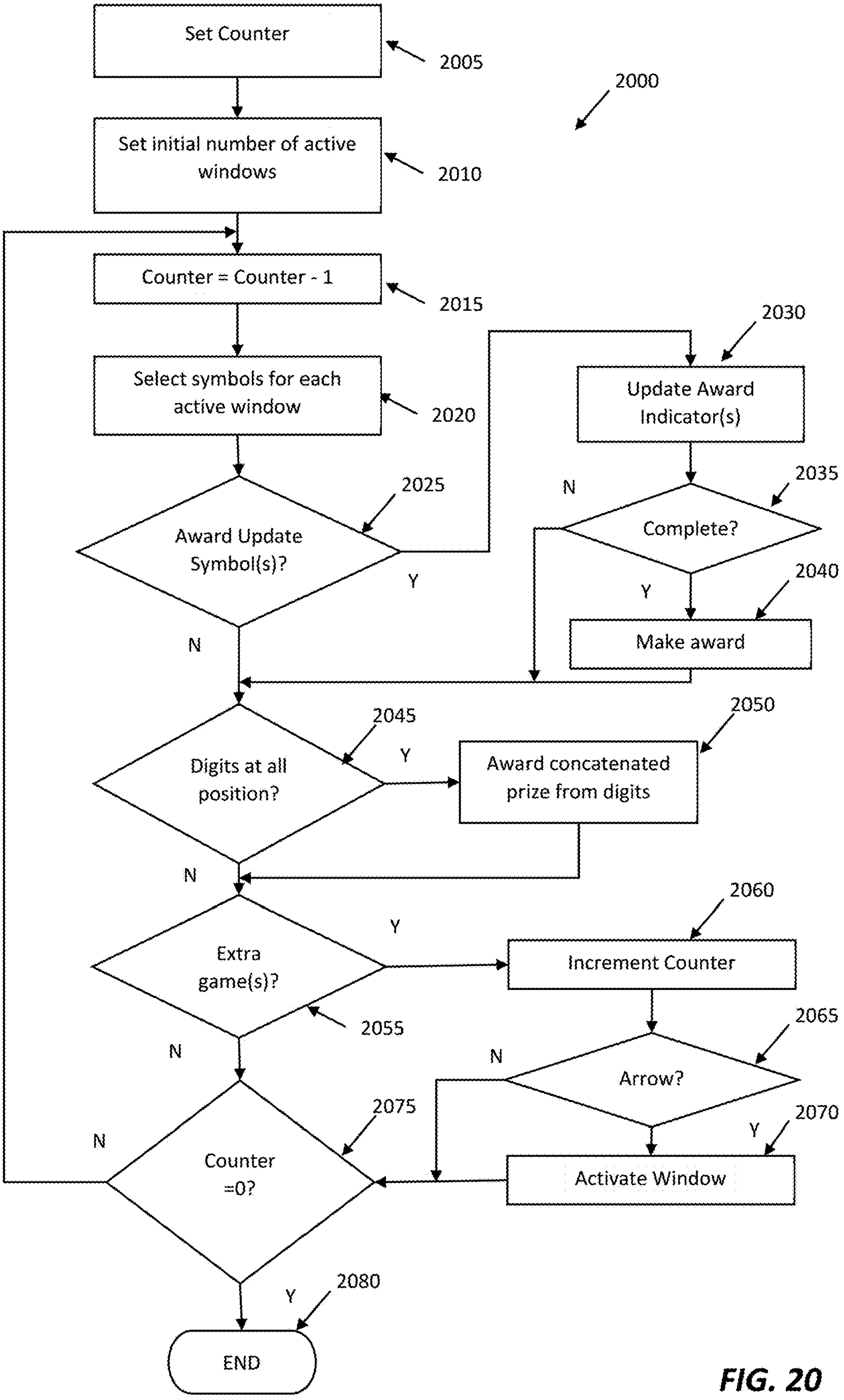
FIG. 20 is a flow chart of another method of operating a gaming device.

FIG. 20 is a flow chart of an example embodiment of a process 2000 for conducting the Jackpot Feature. At step 2005, the processor 204 sets a counter in memory 208 to an initial number of game instances, in this example, to three game instances.

At step 2010, processor 204 sets an initial number of active windows based on the feature state. In the example, there may be up to four active windows with one window corresponding to the base feature state, two windows corresponding to the super feature state, three windows corresponding to the mega feature state and four windows corresponding to the ultra feature state.

Figure 21:
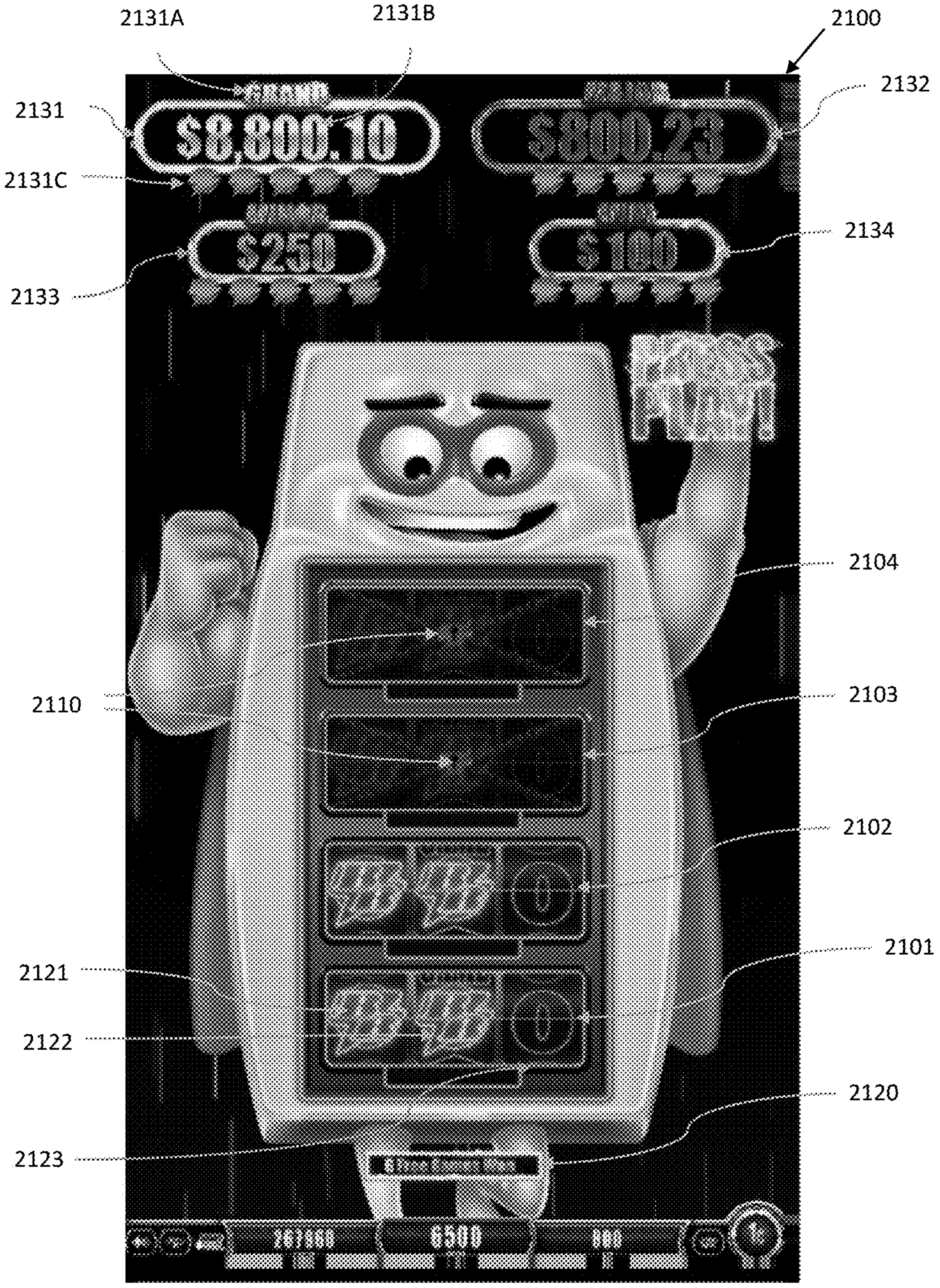
FIGS. 21 to 24 are example screen displays resulting from operating the gaming device.

FIG. 21 is an example screen display 2100 of an initial screen of a Super Jackpot Feature, that is, an instance of the Jackpot Feature triggered when a feature game indicator is in the Super Jackpot Feature state as shown in FIG. 19. Accordingly, in FIG. 21 two windows are active, here first window 2101 and second window 2102 while the third window 2103 and fourth window 2104 are inactive as indicated by lock graphic 2110. Counter graphic 2120 indicates "6 Free Games Won" consistently with the current value of the counter. Each window 2101-2104 is a 1×3 window, that is a window having a single row of three symbol positions. For example, first window 2101 has first symbol position 2121, second symbol position 2122 and third symbol position. Above the windows 2101-2104 are four award indicators 2131-2134 which are displayed in different colors to assist in player perception of interaction with the award indicators during game play. A first, yellow award indicator 2131 corresponding to a progressive Grand jackpot prize, a second, red award indicator 2132 corresponding to a progressive Major jackpot prize, a third, blue award indicator 2133 corresponding to a fixed Minor bonus prize, and a fourth, purple award indicator 2134 corresponding to a fixed Mini bonus prize. As exemplified in relation to first award indicator, each award indicator has a name 2131A of the prize, a value 2131B of the prize and a progress indicator 3131C. In this example, progress indicator 2131C has five lightning bolt graphics that are initially greyed-out. As relevant lightning bolt symbols are collected as will be described in further detail below, the lightning bolt graphics of the progress indicators have their color changed by processor 204 to match the relevant award indicator to indicate progress towards collecting the relevant prize which occurs when five lightning bolts are collected.

At step 2015, processor 204 initiates the first game instance by decrementing the counter by one.

At step 2020, the processor 204 independently selects symbols for each active window (here windows 2101,2102) using a process like that of FIG. 4. In the example, the reel strips are specific to the Jackpot Feature. The symbols on the reels include digit symbols which, in this example, can be 0, 1, 2, 3, 5, 00, 11, 22 or 33 (see for example a 0 digit symbol at symbol position 2123); an extra game symbol, and extra game symbol with arrow and an award update symbol that, in this example, is a green Bolt Bullion logo consistent with the theme of the game (see symbol positions 2121,2122). The processor 204 controls the reel strips in use so that the extra game symbol with arrow only appears on the middle reel of the top-most active window when there is at least one inactive reel. Further, in this example, the reel strips are configured such that the bottom (first) window 2101 only has single digit symbols and double digit symbols become more frequent for higher windows. In this example, the award update symbol appears on all reels.

Other row configurations may be used in other examples (e.g. a 1×4 row, or a 1×2 row). However, it will be appreciated that the row size along with the digit symbols that are used impacts on the size of prizes.

Figure 22:
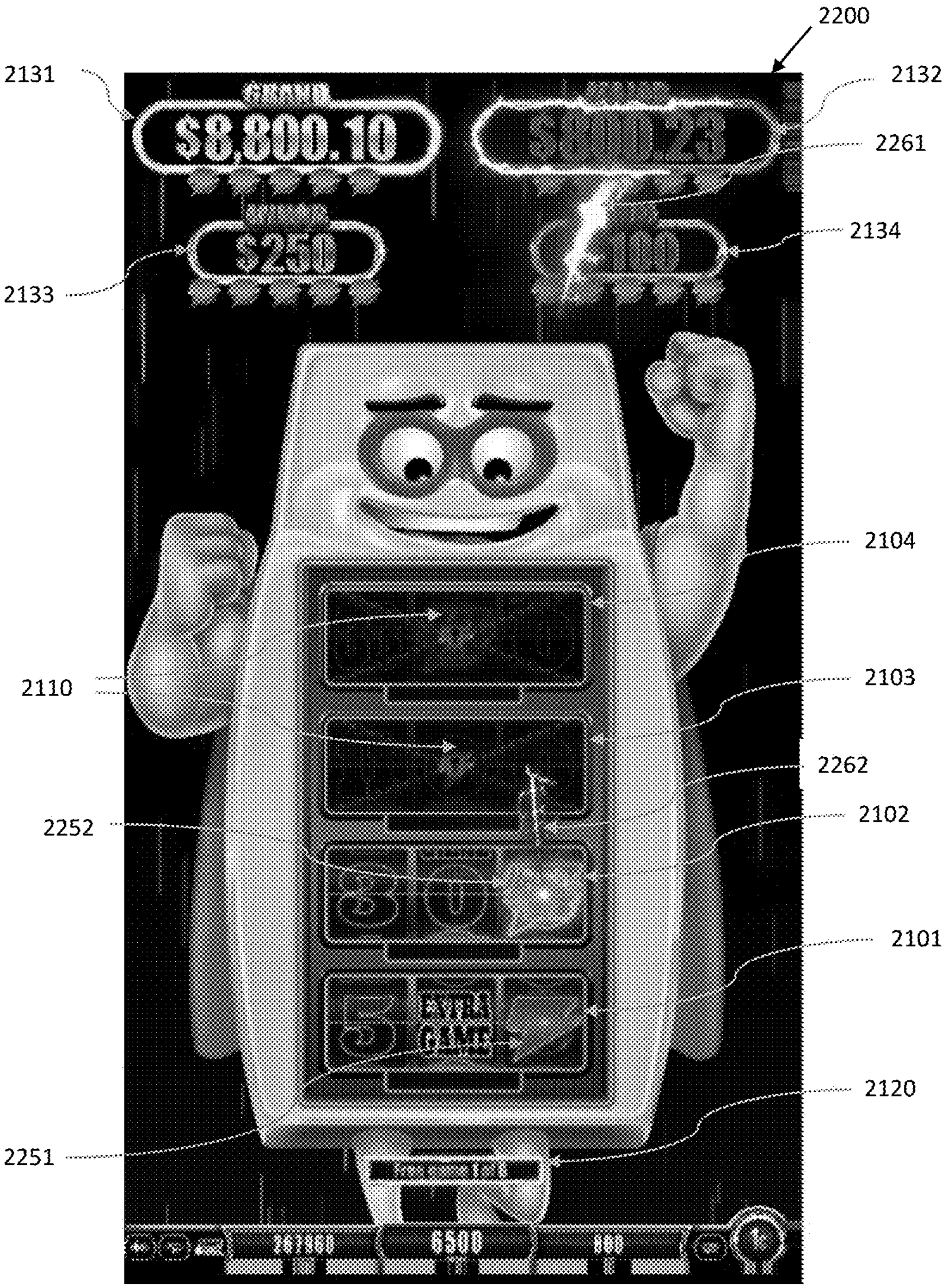

FIG. 22 is an example screen display 2200 after a symbol selection at step 2020 as indicated by counter graphic 2120 being updated to read "Free game 1 of 6". In this example, two award update symbols 2251, 2252 have been selected by processor 204. Accordingly, at step 2025, processor 204 makes a positive determination that the selected symbol include one or more award update symbols and proceeds to step 2030.

In this example, for each award update symbol, the processor 204 makes a random selection using RNG 212 and a weighted table as to which of award indicators 2131-2134 to update. A series of animations communicate which award indicator is updated. FIG. 22 shows an example where processor 204 has determined that update symbol 2251 is a major jackpot update symbol and has changed the update symbol 2251 to have the appearance of a red lightning bolt. Red lightning animation 2261 moves from red lightning bolt update symbol 2251 to Major jackpot award indicator 2132. Processor 204 will also control (not shown in FIG. 22), the left most greyed-out lightning bolt graphic of the associated progress indicator to turn red. The number of lightning bolt graphics that are colored indicates the state of progress. It will be observed from the foregoing that all graphics associated with the Major jackpot prize share the same color to assist in communicating the relationship between the red lightning bolt update symbol 2251 and the Major jackpot award indicator 2132. In the example of FIG. 22, processor 204 has determined that update symbol 2252 will be a Mini bonus update symbol and but has yet to change display of update symbol 2252 to have the appearance of a purple lightning bolt. At this stage of the animation, processor 204 controls the display 240 to show a purple lightning animation 2262 striking update symbol 2252 to communicate that it is to be changed to a Mini bonus update symbol.

Following update of the award indicators 2131-2134, at step 2035 processor 204 determines whether any of the progress indicators has been completed, and if so makes an award of the amount shown on the relevant award indicator at step 2040.

The processor 204 then proceeds to step 2045 and determines whether there are digit symbols at all of the symbol positions of any of the active windows. In the example of FIG. 22, there is no active window 2101,2102 that has digit symbols at all of the symbol positions. Accordingly, the processor 204 proceeds to step 2055 and determines whether the selected symbols include one or more extra game symbols. If the processor 204 makes a positive determination, processor 204 proceeds to step 2060 and increments the free game counter in memory 208. Then, at step 2065, processor 204 determines whether the extra game symbol incorporated an arrow symbol and, if so, activates the next game window at step 2070 before determining at step 2075 whether the counter has reached zero. Where the free game counter in memory 208 is non-zero, processor 204 proceeds to step 2015 and initiates another game instances. It will be appreciated that where processor 204 conducts step 2075 following step 2065 or 2070, processor 204 will always make a negative determination at step 2075. Accordingly, in other examples, the process could flow directly from steps 2065 or 2070 to step 2015. It will also be appreciated that some of the steps described above could be conducted in different orders. For example, the order of steps 2025, 2045 and 2055 could be changed.

It will be appreciated that in the example of FIG. 22, as there is no extra game symbol, the processor 204 will make a negative determination at step 2055 and proceed to step 2075.

Figure 23:
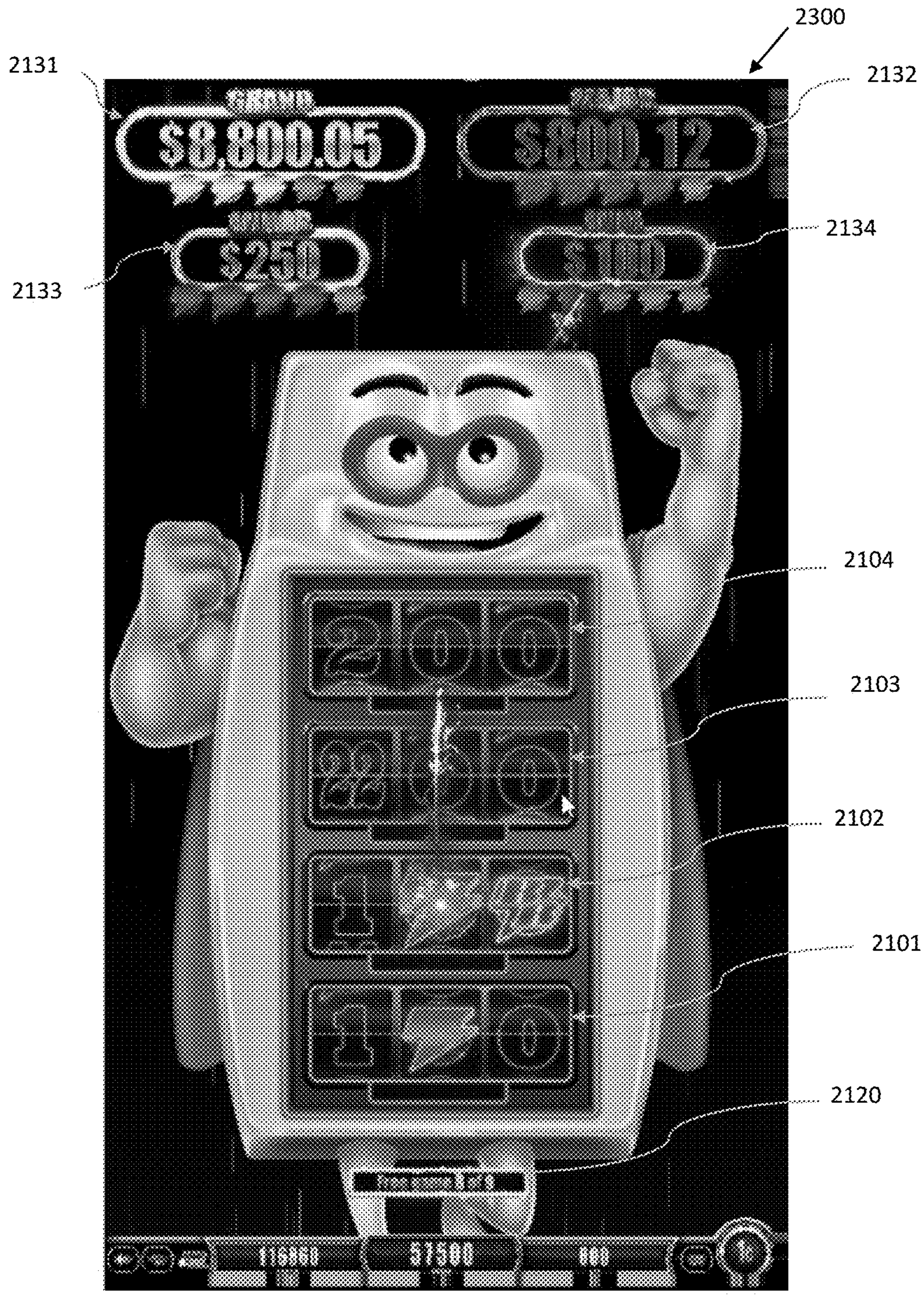

FIG. 23 is an example of a screen display 2300 where all four windows 2101-2104 are active. As indicated above all four windows 2101-2104 may become active either as a result of the appearance of the extra game symbol with arrow or by the jackpot feature being triggered in the Ultra feature state. In this example, third window 2103 and fourth window 2104 each only have digit symbols. Accordingly, at step 2045, processor 204 makes a positive determination and proceeds to step 2050 and awards a concatenated prize derived from a multi-digit number formed by concatenating the digits of the digit symbols.

Figure 24:
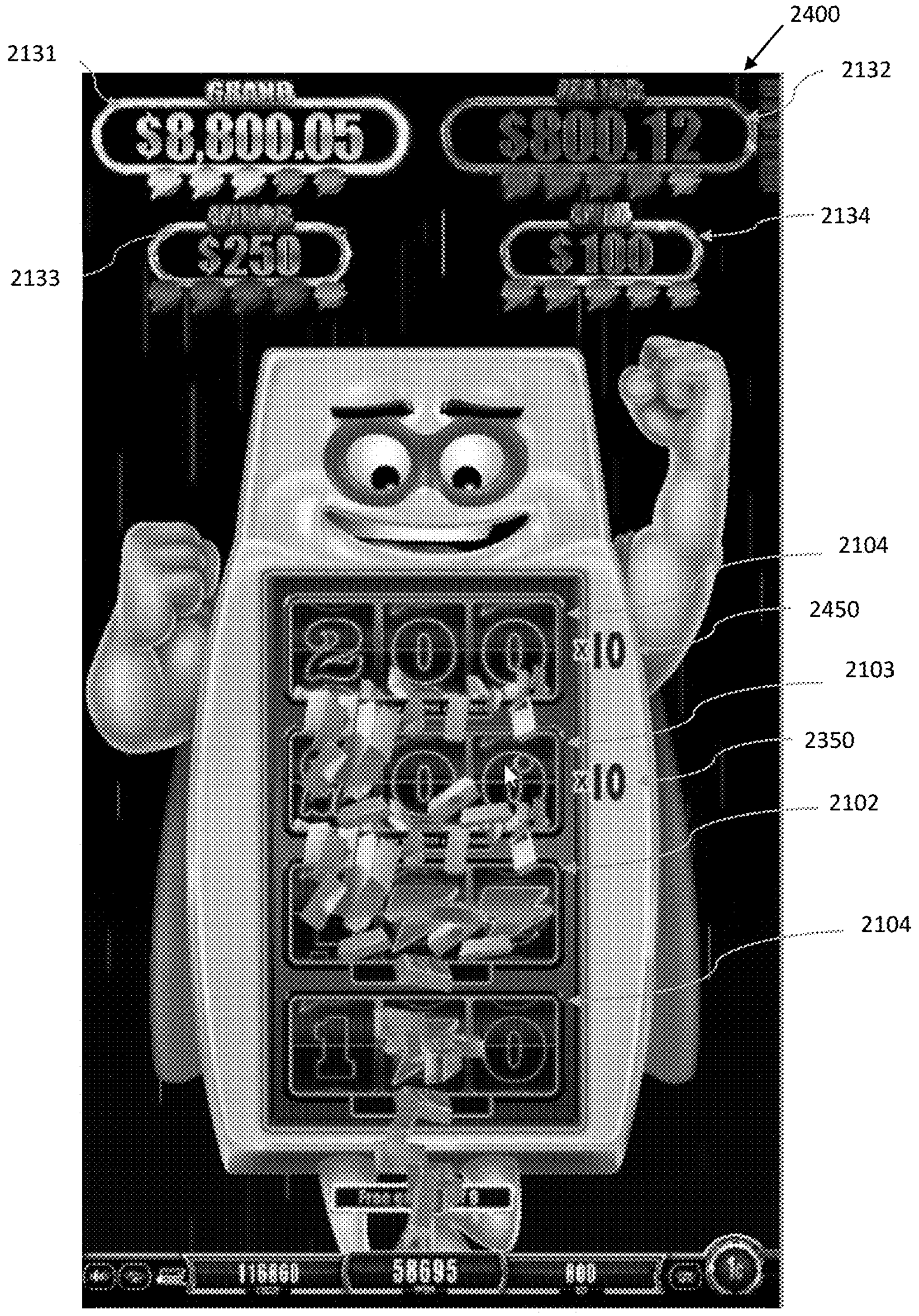

Thus, in the example of the third window 2103 the prize is formed by processor 204 concatenating the digits “22”, “0”, and “0” to get “2200” and for the fourth window 2104, processor 204 concatenates “2” “0”, and “0” to get “200”. In this example, as shown in screen display 2400 of FIG. 24, processor 204 then applies any bet multiplier to the concatenated prize. As shown in the example, of FIG. 24, the bet multiplier is “10” 2450 so that the total awarded for the third window 2103 is 22000 credits and the total awarded for the fourth window 2104 is 2000 credits.

When processor 204 determines at step 2075 that the counter has reached zero, the processor 204 ends the Jackpot Feature at step 2080.

Figure 25:
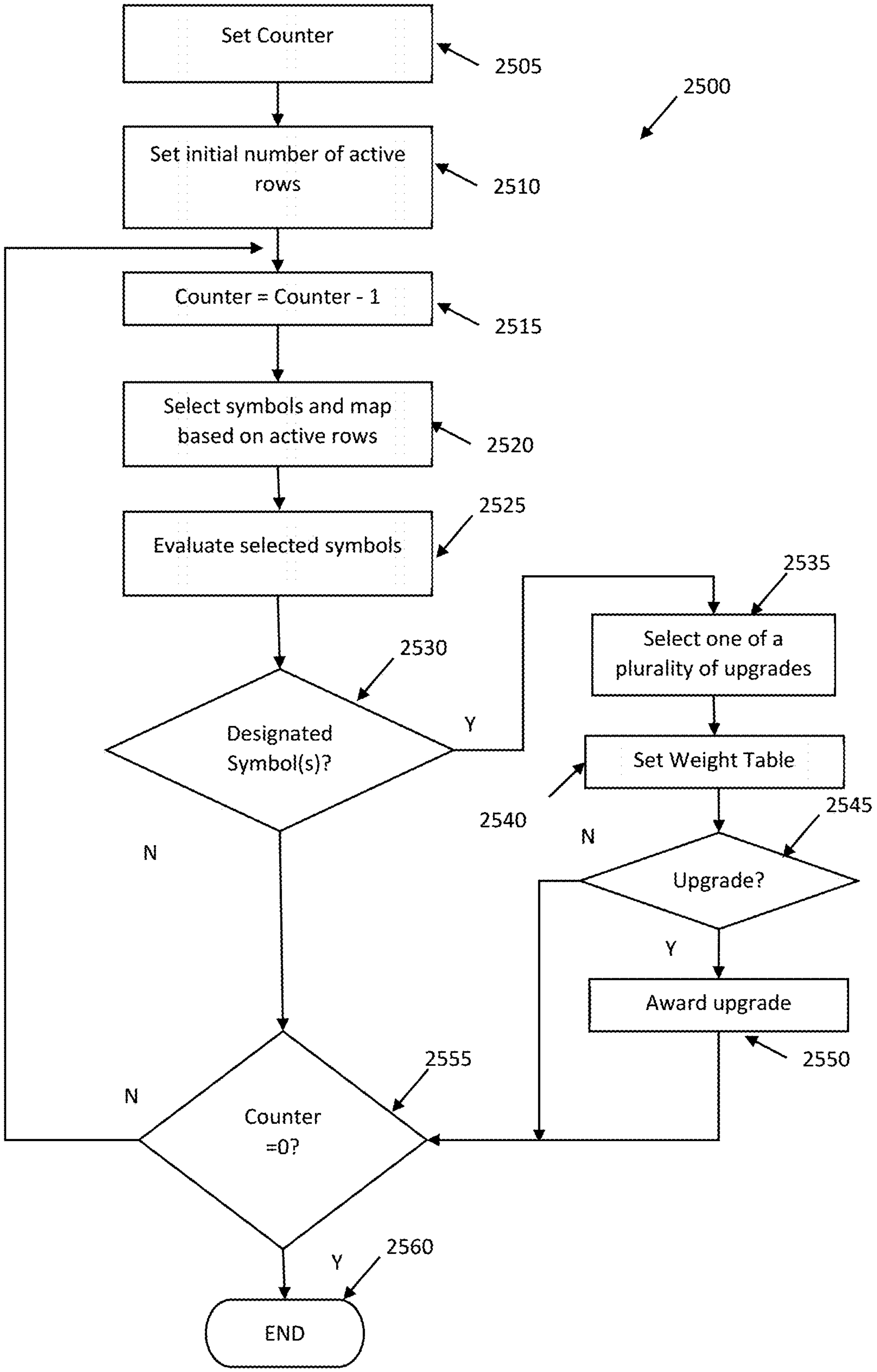
FIG. 25 is a flow chart of another method of operating a gaming device.
Figure 26:
FIGS. 26 to 39 are example screen displays resulting from operating the gaming device.

As described above, if either of the Chili Feature states are active as indicated by the Chili Feature indicators 632, 635, a Chili Feature feature game can be activated. FIG. 25 is a flow chart of an example process 2500 for conducting the Chili Feature feature game and FIG. 26 is an example initial screen display 2600 when the Chili Feature is initiated. At step 2505, the processor 204 sets a free game counter in memory 208 to an initial value, in this example, 8 free game instances as indicated by game message 2650 “8 Free Games Won! Press Start Feature”. In each feature state of the Chili Feature, there are five columns of symbol positions 2621-2625 but the number of rows of symbol positions varies. In this example, the Normal state starts with four rows, the Super state starts with six rows, the Mega state starts with seven rows and the Ultra state starts with eight rows. In the example of FIG. 26, the Chili Feature has been triggered in the Super Feature state where six rows 2611-2616 of symbol positions are active. That is, at step 2510, processor 204 has set the initial number of active rows to six based on the feature state.

Three upgrade indicators 2631-2633 are displayed above the active rows 2611-2616 of symbol positions. First upgrade indicator 2631 indicates that one possible upgrade is the award of “2 Extra Free Games”, that is an award of two additional game instances. Second upgrade indicator 2632 indicates that another possible upgrade is “Grow to 7 Rows”, that is an add a row upgrade where at least one additional row of symbol positions will be added. Third upgrade indicator 2633 indicates “Change [PIC2] to [PIC1]”, that is a change symbol upgrade. Current symbol indicator 2634 shows which symbols are currently in use and, as any symbols are changed, reflects the changed symbols. In FIG. 26 it shows that the current symbols are PIC1 (Bull), PIC2 (Armadillo), PIC3 (Sombrero), PIC4 (Guitar) and PIC 5 (Cactus). It will be apparent that second and third upgrade indicators 2633,2634 are advantageously modified based on the current state of the feature game. In an example, when no further upgrades are possible, the upgrade is changed, for example to “2 Extra Free Games”. In another example, if any of the upgrades are exhausted because no further upgrades are possible, upgrade indicators 2633,264 are greyed out to indicate they are no longer available.

Figure 27:
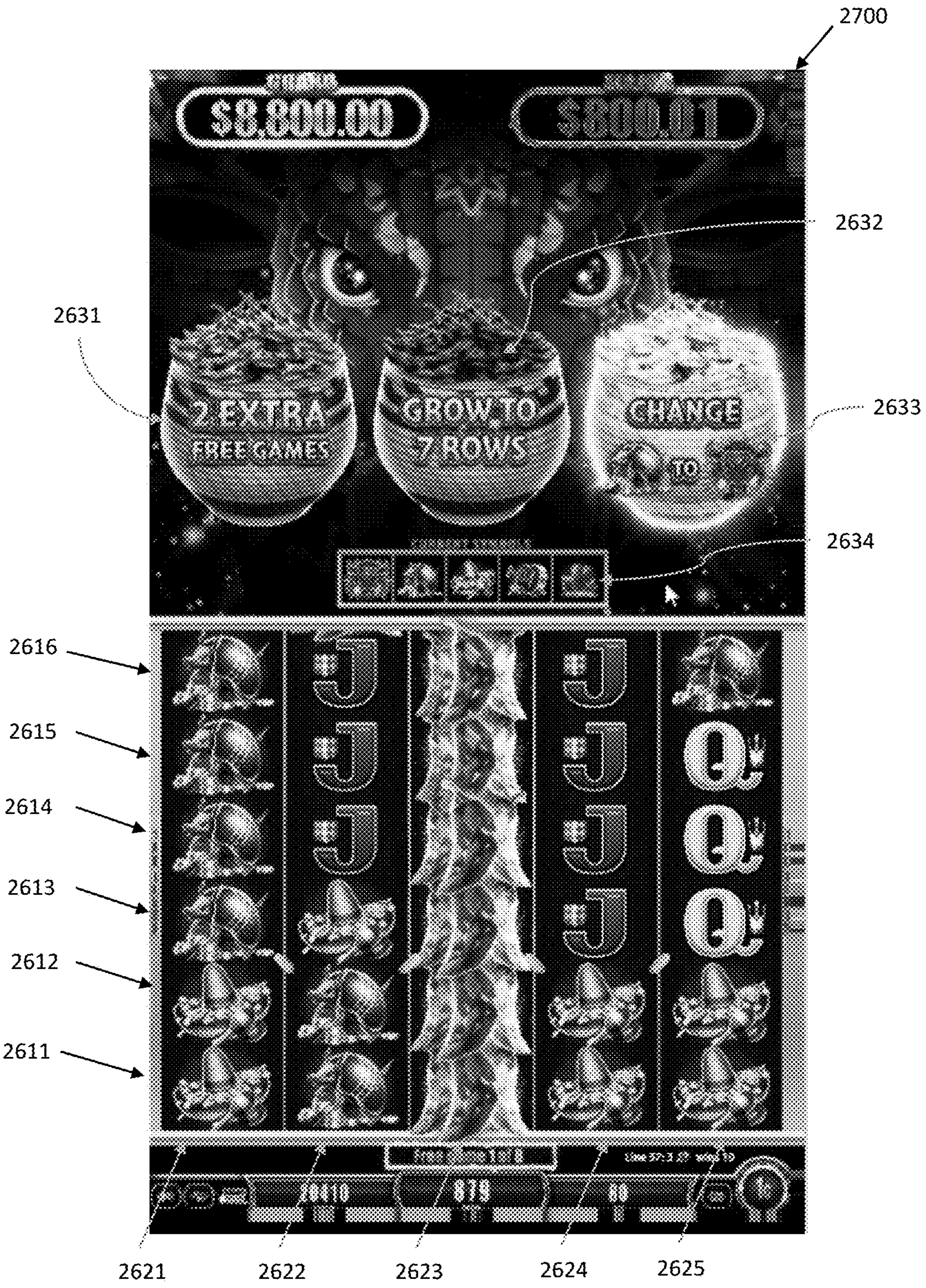

At step 2515, processor 204 starts a first game instance by decrementing the counter by one. Then at step 2520, processor 204 selects symbols from a Chili Feature set of reel strips using a method analogous to that described above in relation to FIG. 4 with the modification that the number of symbols mapped to symbol positions corresponds to the number of active rows. FIG. 27 is an example screen display 2700 resulting from step 2520.

At step 2525, processor 204 evaluates the selected symbols for winning combinations based on set of win lines and a pay table stored in memory 208. In an example, the win lines evaluated by processor 204 depend on the number of active rows.

At step 2530, the processor 204 determines whether the selected symbols meet a condition for determining whether to award an upgrade. In this example, the condition is that the selected symbols include one or more designated symbols, here “WILD” symbols visually represented as chilies, and in the example, of FIG. 27 occupying every symbol position of third column 2623.

At step 2535, the processor 204 uses the random number generator 212 and a weighted table in memory 208 to select one of the upgrades. The weightings in the table are used to control the relative frequency of the upgrades being awarded. In an example, the weightings are 25% for two extra free games and growing the window and 50% for changing the symbol.

At step 2545, having selected one of the upgrades, the processor 204 determines whether to award the selected upgrade using the random number generator 212 and one of a plurality of sets of weightings which define whether the upgrade will or will not be triggered. In an example the weightings are selected by the processor 204 at step 2540 based on the feature state when the feature game was initiated (Normal, Super, Mega or Ultra), and the current state of the relevant upgrade. In an example, the weightings vary based on these factors in order to enable fine grain control of the return to player from the respective upgrades. Upon making a positive determination at step 2545, the processor 204 applies the upgrade at step 2550.

FIG. 27 is an example screen display 2700 where the change symbol upgrade indicator 2633 has been highlighted to indicate that it has been selected by the processor 204 at step 2535 but the outcome of the determination at step 2545 has yet to be indicated. In the case where the processor 204 makes a negative determination at step 2545, the processor 204 applies a small animation to the highlighted upgrade before reverting to a normal display of the upgrade indicator 2633.

Figure 28:
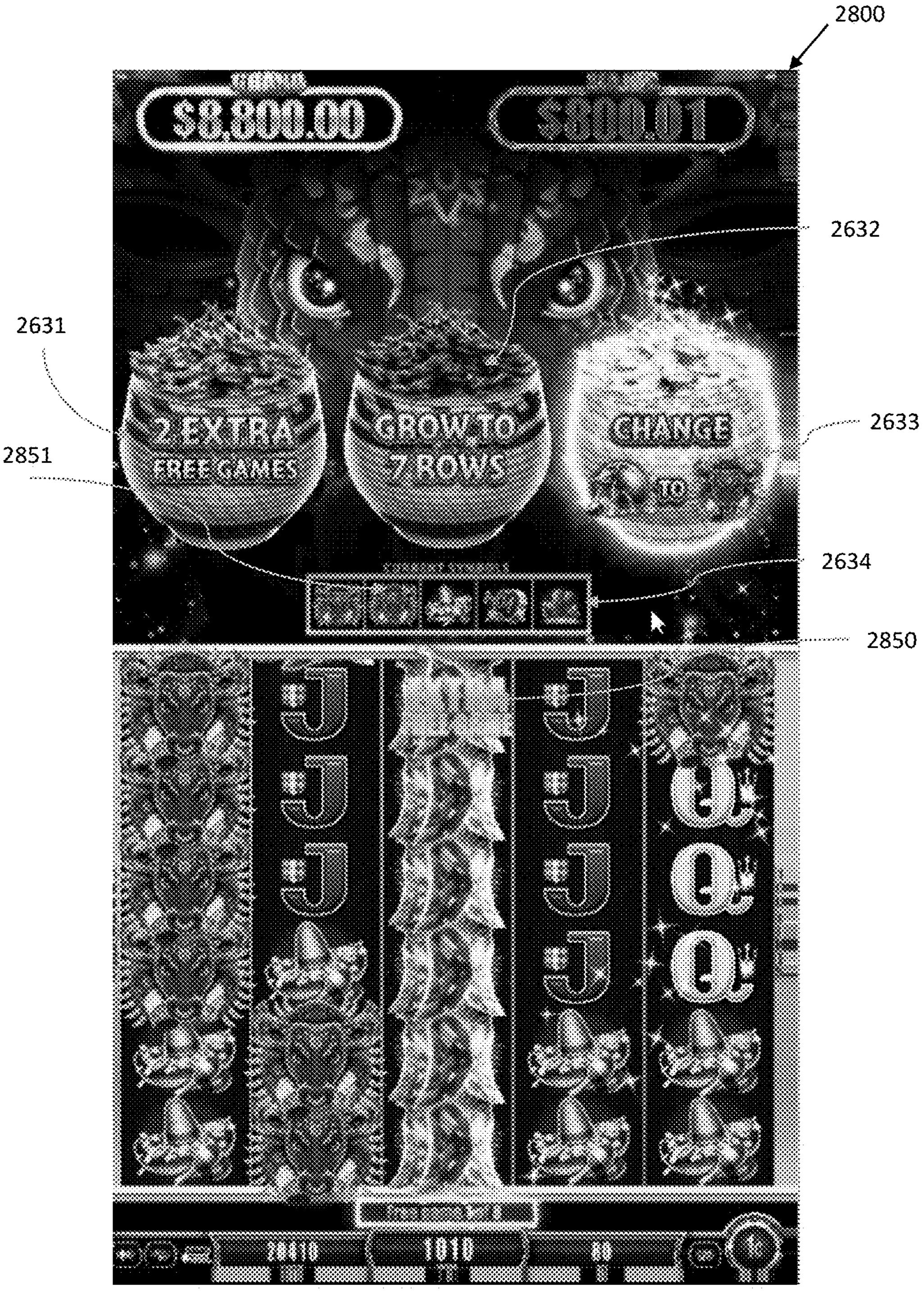

FIG. 28 is an example screen display where processor 204 has controlled display 240 to show that the change symbol upgrade has been applied. In this respect, processor 204 has changed current symbol indicator 2634 so that a PIC1/Bull symbol 2851 is displayed at the second position because PIC2/Armadillo has been changed to PIC1/Bull. In addition, display 240 is controlled to display an “Extra Free Game” message 2850 to indicate that application of the upgrade also includes an extra free game. Advantageously, awarding a free game ensures that the player has at least one game instance to gain the benefit of the upgrade.

Figure 29:
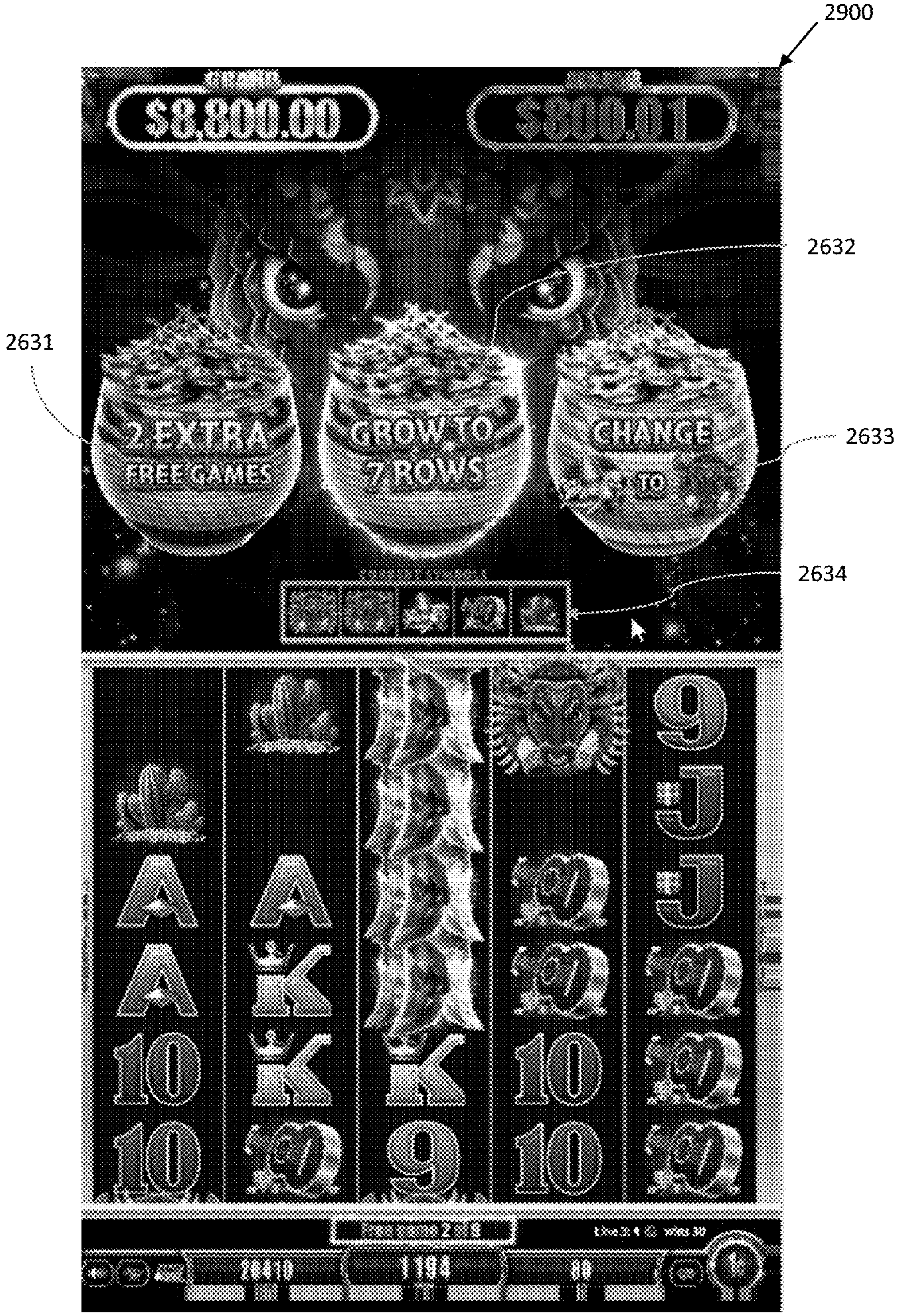
Figure 30:
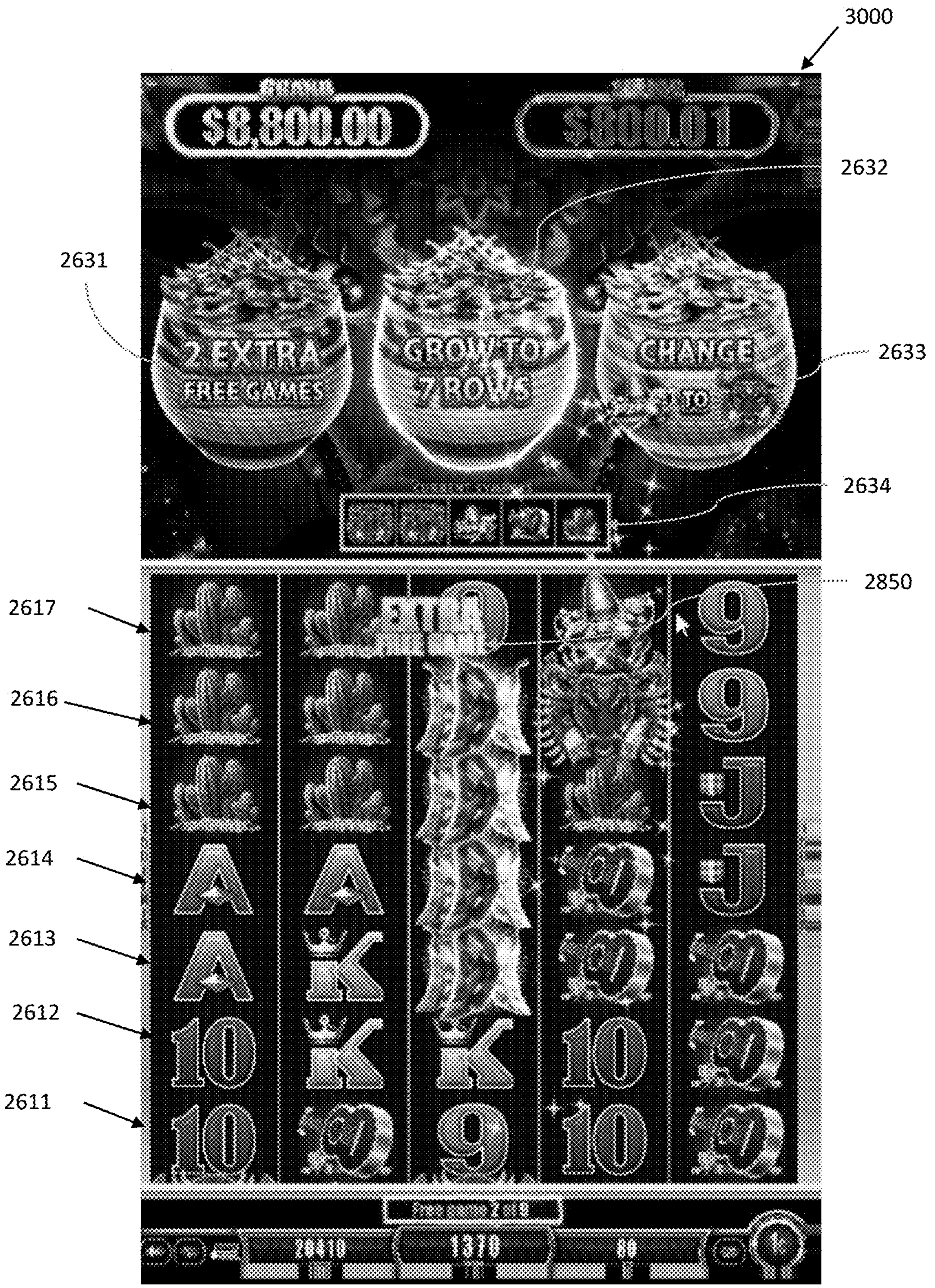

FIG. 29 is an example of a subsequent screen display 2900 where processor 204 has selected the add a row upgrade and has controlled display of the "Grow to 7 Rows" upgrade indicator 2632 to be highlighted. FIG. 30 is an example screen display 3000 where processor 240 has controlled the display 240 to apply the upgrade such that there are now seven rows 2611-2617 of symbol positions. Again, processor 204 controls the display to show an "Extra Free Game" message 2850 to indicate that application of the upgrade also includes an extra free game.

Figure 31:
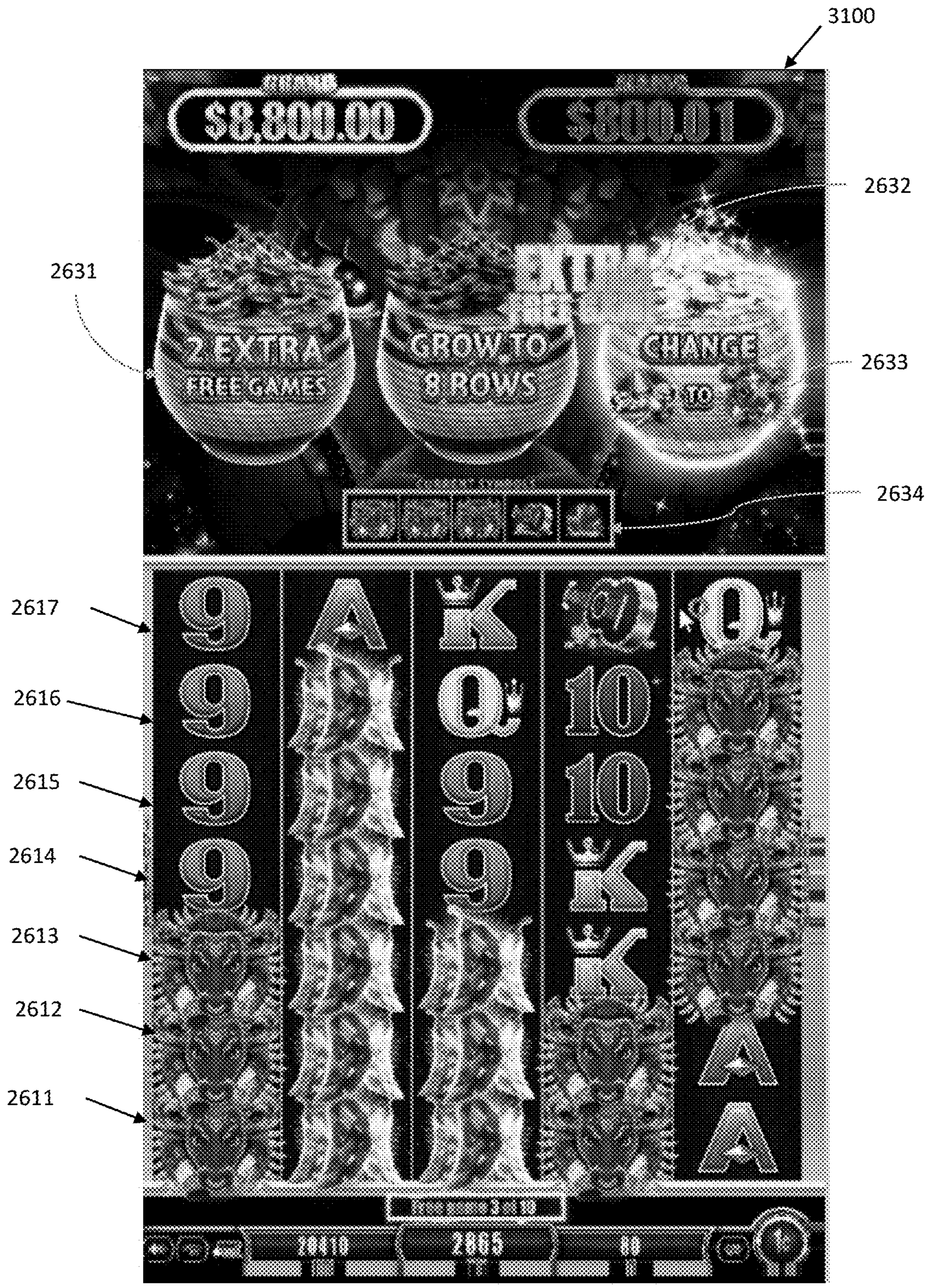

FIG. 31 is a further example screen display that illustrates a subsequent game instance after processor 204 has applied the add a row upgrade. It will be observed that processor 204 has controlled the display 240 to change the message in respect of the row upgrade so that upgrade indicator 2632 now displays the message "Grow to 8 Rows". FIG. 31 shows a game instance where processor 204 has selected the change a symbol upgrade which now shows "Change [PIC3/Sombrero] to [PIC1/Bull]" and has applied the upgrade so that current symbol indicator 2634 now shoes three PIC1/Bull symbols.

Figure 32:

At step 2555, processor 204 checks the value of the counter to check whether any free game instances remain, and if the counter is non-zero, reverts to step 2515 and initiates the next game instance. If the counter is zero, the Chili Feature ends 2560. FIG. 32 shows an example screen display 3200 at the conclusion of the Chili Feature where processor 204 controls the display to display a total award message 3205 indicating "Total Win $133.90".

Figure 33:
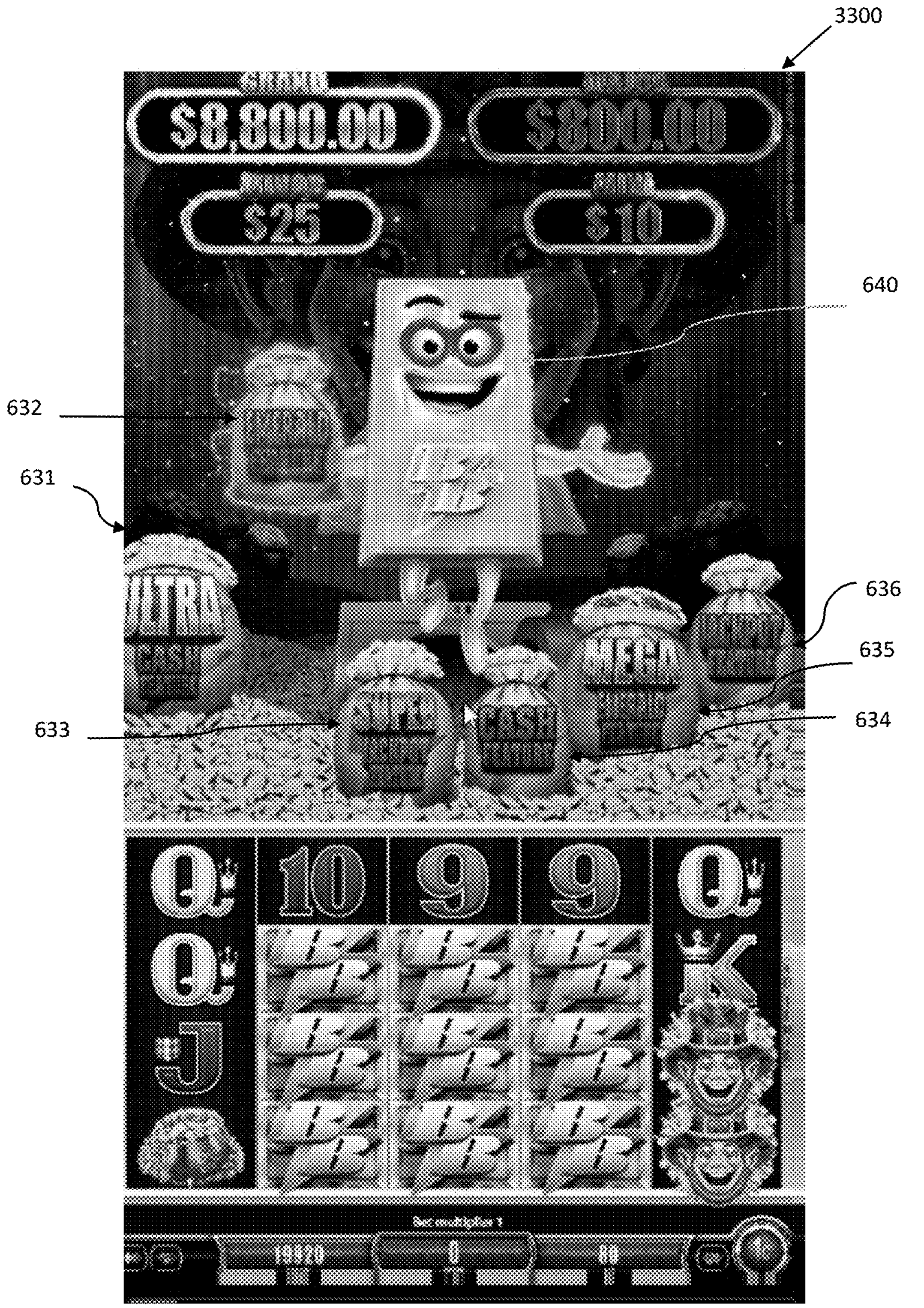

It will be appreciated that the above examples can be applied to other feature games. FIG. 33 is an example screen display 3300 where the Bolt Bullion theme is retained but is deployed in conjunction with a spinning reel game having a different theme. In this example, the Cash Feature and Jackpot Features are retained but the Chili Feature is replaced with an "Emerald Feature", that is so that second and fifth feature indicators 632,635 show activatable feature states of the Emerald Feature. As with the example above, the Emerald Feature has Normal, Super, Mega and Ultra states. FIG. 33 show an example where the Normal (base) state of the Emerald Feature has been awarded such that animated character 640 has been animated as picking up second feature state indicator 632. Screen display 3300 also shows a case where feature indicator 635 shows the "Mega Feature State".

Figure 34:

FIG. 34 is an example screen display 3400 after the processor 204 controls the display 240 to transition to the Emerald Feature. While the theme is different, implementation of the Emerald Feature by processor 204 shares many characteristics with the Chili Feature described above and the processor 204 implements the process 2500 of FIG. 25 when conducting the Emerald Feature but with a different set of upgrades. Accordingly, the following description of the Emerald Feature primarily focusses on the differences to the Chili Feature In this respect, it will be appreciated from game message 2650 "8 Free Games Won! Press Start Feature" that in this example, the processor 204 also sets the free game counter in memory 208 to an initial value of 8 free game. In each feature state of the Emerald Feature, there are five columns of symbol positions 3421-3425 but the number of rows of symbol positions varies. In this example, the Normal state starts with four rows, the Super state starts with six rows, the Mega state starts with seven rows and the Ultra state starts with eight rows. As in the example of FIG. 34, the Emerald Feature has been triggered in the Normal Feature state, four rows of symbol positions 3411-3416 are active.

Three upgrade indicators 3431-3433 are displayed above the active rows 3411-2616 of symbol positions. First upgrade indicator 2631 indicates that one possible upgrade is the award of an "Extra Free Game", that is an award of one additional game instance in contrast to the two in the Chili Feature). Second upgrade indicator 3432 indicates that another possible upgrade is "Grow to 6 Rows", which is an add a row upgrade where at least one additional row of symbol positions will be added that operates in the same way as the equivalent upgrade described in relation to the Chili Feature. Third upgrade indicator 3433 indicates "Add Wilds", that is an add wilds upgrade. Wild counter 3434 is graphically based on the wild symbol and shows the total number of wild symbols collected. In screen display 3400, wild counter 3434 is blank as the Emerald Feature is yet to begin and the counter starts at zero.

Figure 35:
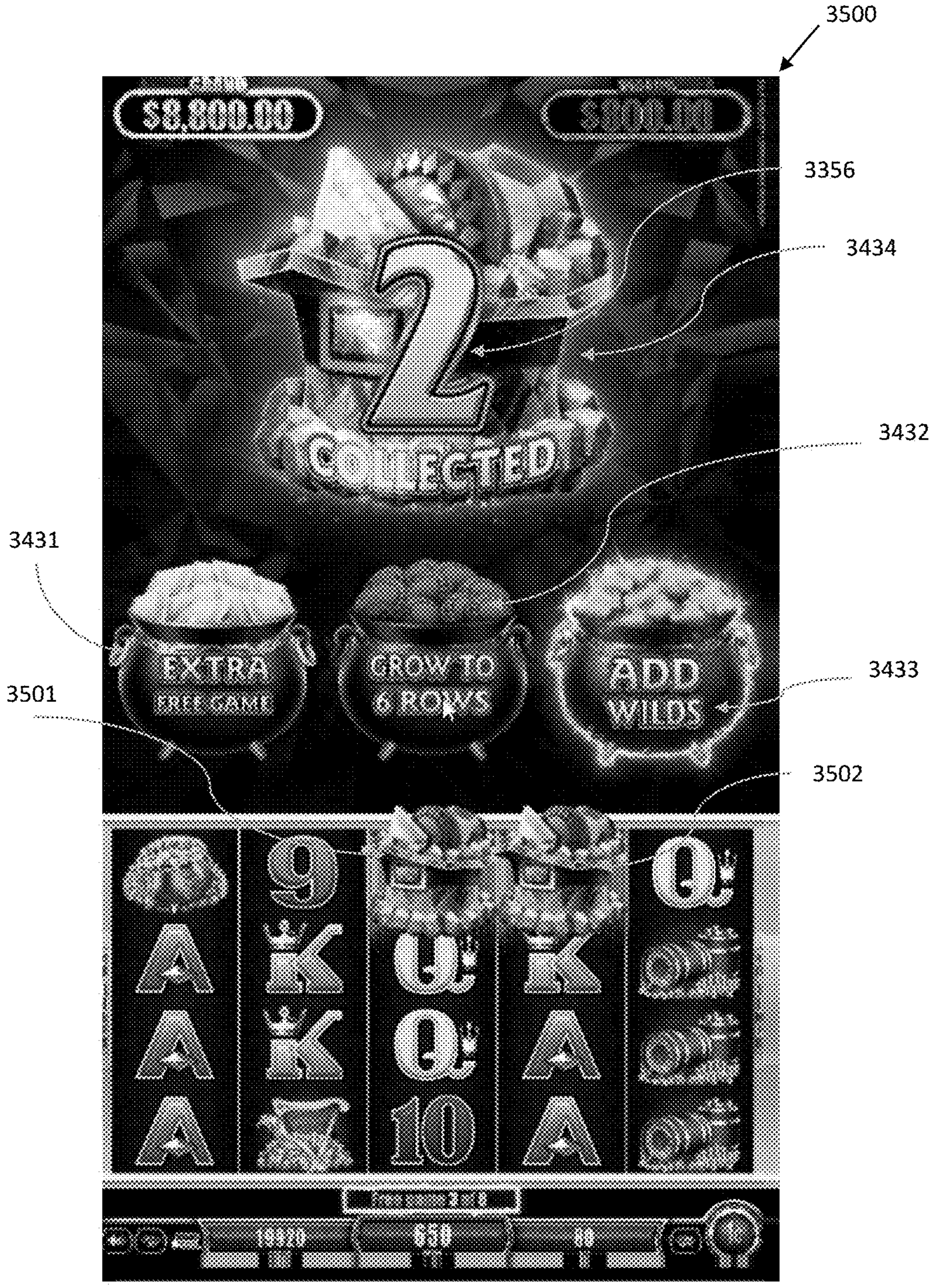

FIG. 35 is an example screen display 3500 of an outcome of a third free game instance. In this example, the symbols selected by processor 204 include two wild symbols 3501, 3502. In this example, the wild symbol is the designated symbol and hence processor 204 makes a positive determination at step 2530. FIG. 35 shows an example, where the processor 204 has selected the add wilds upgrade at step 2535 such that add wilds upgrade indicator 3433 has been highlighted. FIG. 35 also shows a case where the processor 204 has made a positive determination at step 2545 and awarded the upgrade at step 2550. The award of the upgrade is reflected in updated wild counter 3434 which incorporates a number 3560, in this example the number "2" to reflect that two wilds have been collected. In the example of the Normal state, the applied upgrade is the number of "Green Wild" symbols that have been selected, here two Green Wild symbols 3501,3502. (In this example, the hat portion of the wild symbol is green.) As described further below, collected wilds when applied as are "Purple Wild" and wild counter 3454 is colored purple to reflect this distinction. This visual distinction enables a player to distinguish between applied wild symbols and selected wild symbols.

Figure 36:
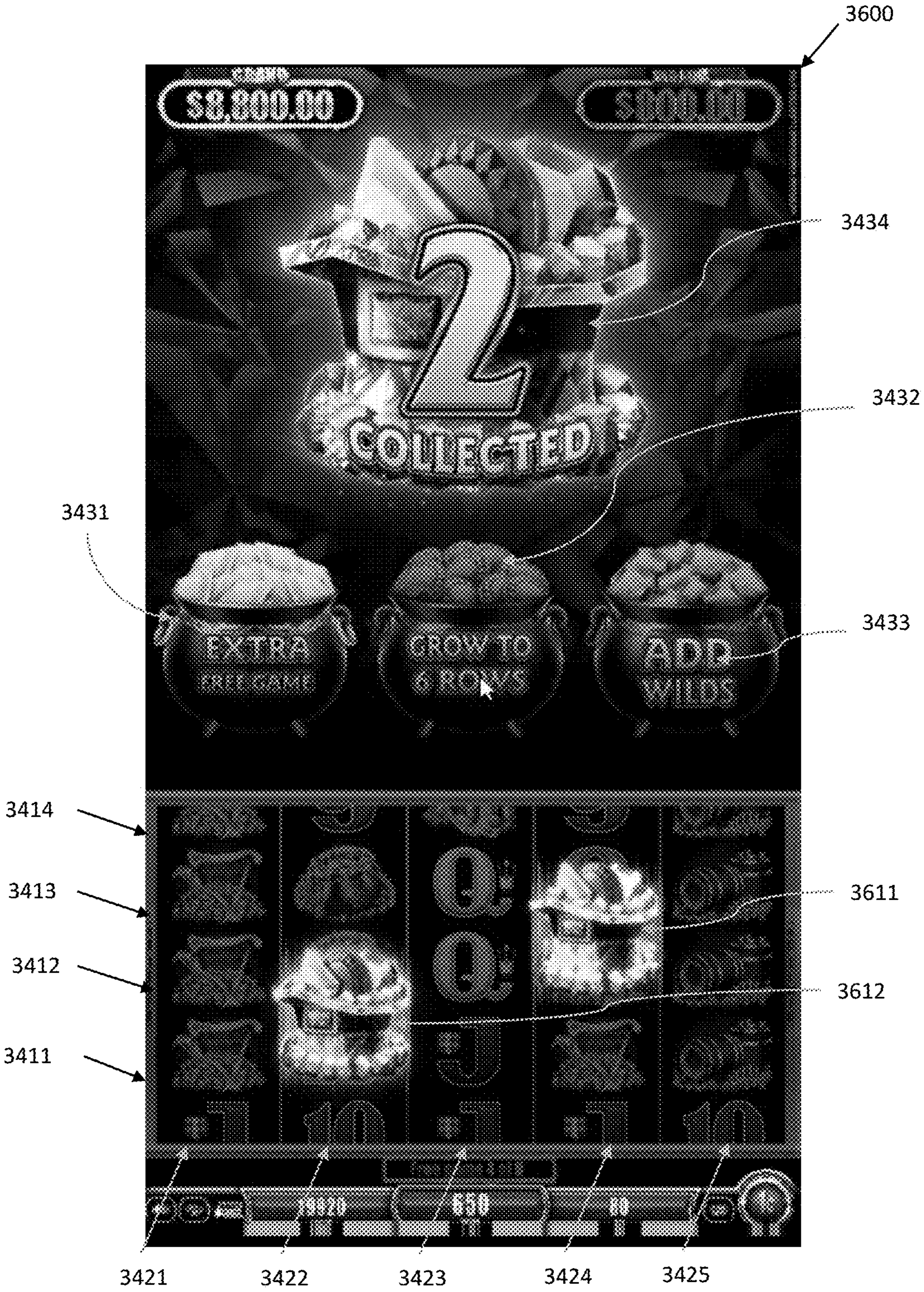

FIG. 36 is an example screen display 3600 showing the processor 204 applying the collected wild symbols, with purple wild symbols 3611,3612 being animated to symbol positions selected by processor 204 using random number generator from symbol positions of the second to fifth columns 3422-3424. In this example, the screen display 3600 captures the first purple wild symbol 3611 being positioned at a symbol position at the intersection of the second column 3422 and second row 3412 and the second purple wild symbol 3612 being positioned at a symbol position at the intersection of the fourth column 3424 and third row 3413.

Figure 37:
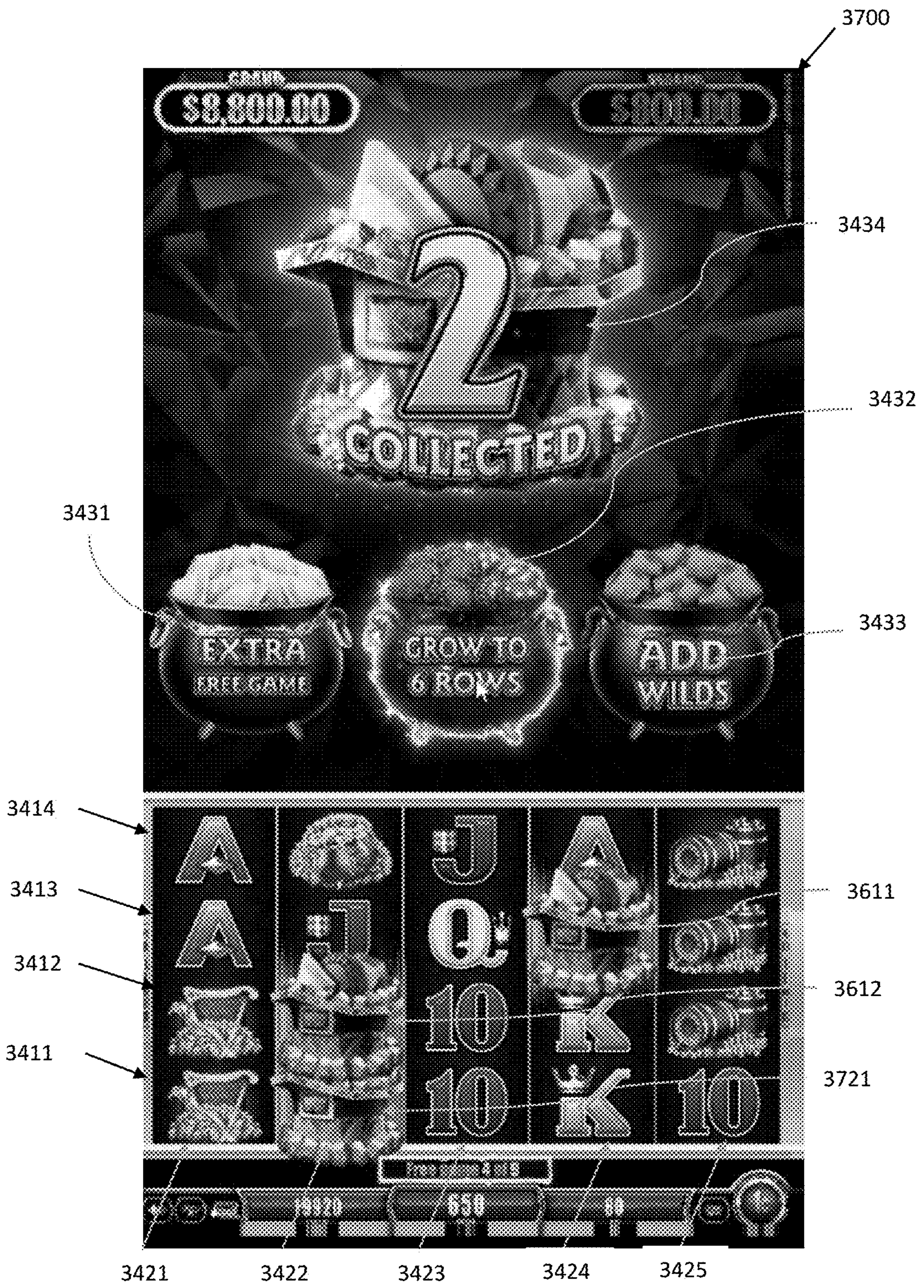

FIG. 37 is an example of a subsequent screen display 3700 after the processor 204 has selected symbols from reel strips from which it will be apparent that the positioning of first and second purple wild symbols 3611,3612 overrides the symbol selected for the symbol position at which the wild symbols 3611,3612 have been positioned by processor 204.

FIG. 37 also shows an example, where the selected symbols include green wild symbol 3422 and where at step 2535 such that add a row upgrade indicator 3432 has been highlighted.

Figure 38:
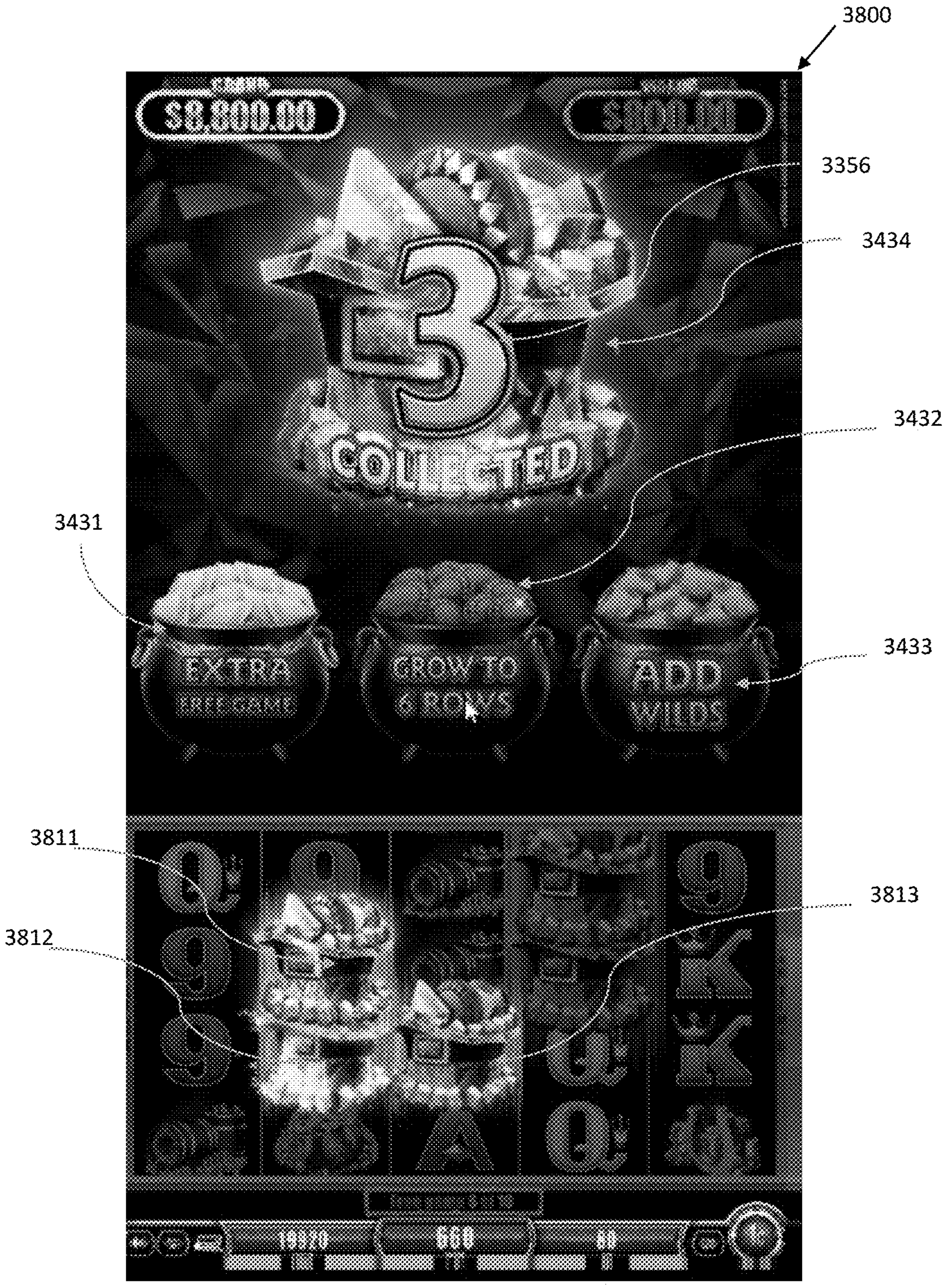

FIG. 38 illustrates that as more purple wild symbols are collected, the counter 3434 is updated to show a new number 3356 (here the number "3"). The screen display 3800 of FIG. 38 also illustrates an example of processor 204 randomly selecting symbol positions for three purple wild symbols 3811-3813.

Figure 39:
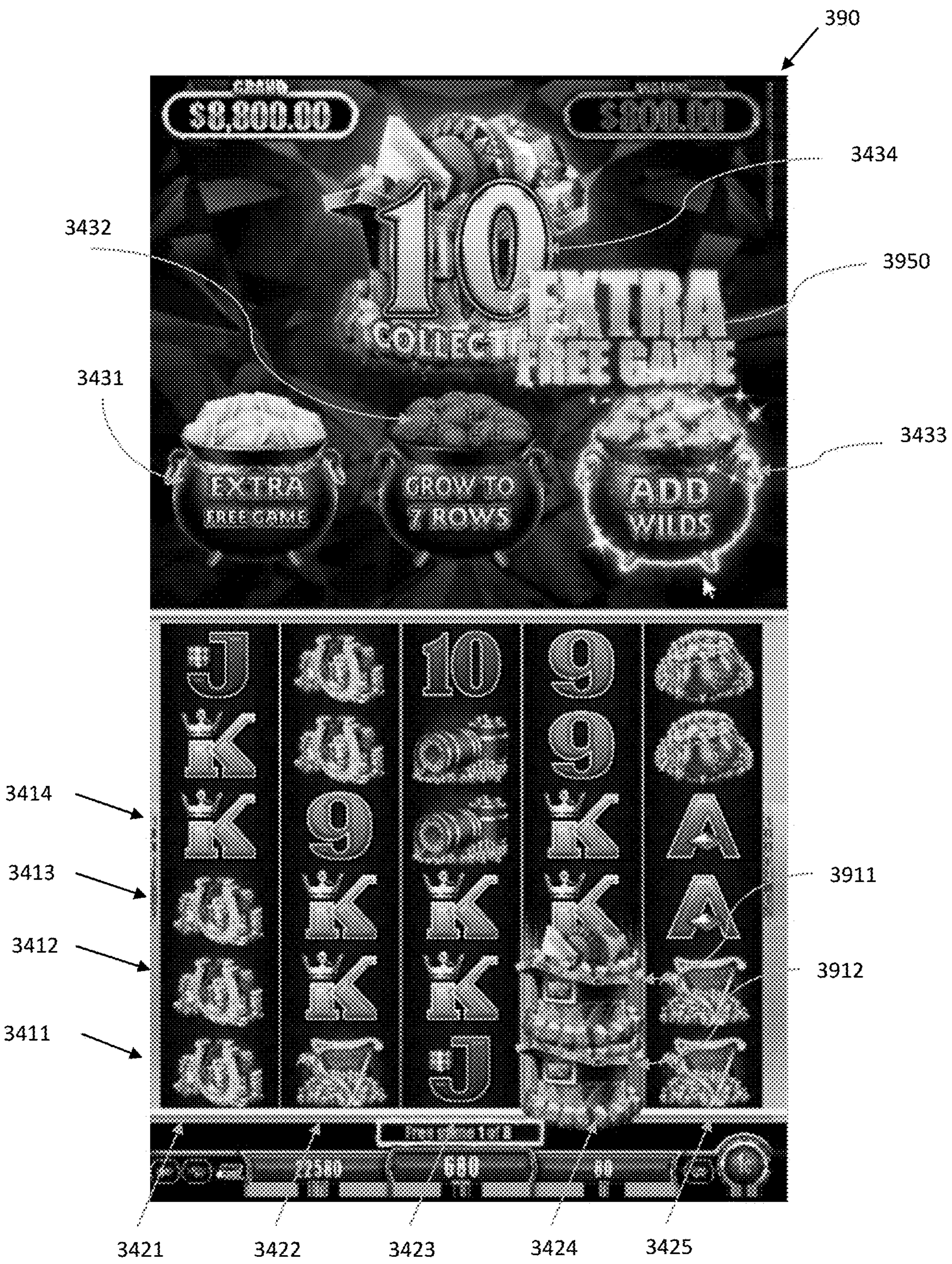

FIG. 39 is an example screen display 3900 of an example implementation where processor 204 randomly determines the number of wild symbols to be added to counter using RNG 212 and a weighted table in memory 208. In this example, processor 204 has determined to add 10 purple wild symbols as illustrated by wild counter 3434. Screen display 3900 also shows game message 3950 which indicates the award of "Extra Free Game". The award of an extra free game ensures at least one additional game instance is conducted with the upgrade applied.

EXAMPLE EMBODIMENTS

An example embodiment provides a gaming device comprising:

a display;

a random number generator;

at least one input mechanism operable to input a wager;

a processor; and a memory storing instructions which, when executed by the processor, cause the processor to:

select, using the random number generator, a subset of a plurality of symbol positions to be occupied by prize value symbols;

control the display to display prize value symbols at the subset of symbol positions;

select, for at least one game instance, using the random number generator, stopping positions for each of the plurality of reel strips, wherein each reel strip is associated with a column of the plurality of symbol positions, and wherein each reel strip comprises at least one overlay symbol and at least one blank symbols;

control the display to show the reel strips spinning on top of the prize value symbols such that (i) each respective prize value symbol is entirely visible when only blank symbols are in register with the respective prize value symbol, and (ii) each respective prize value symbol is at least partially obscured when at least one overlay symbol is in register with the respective prize value symbol;

control the display to show the reel strips spinning to the selected stopping positions; and award, for each respective prize value symbol is in register with the respective prize value symbol in the selected stopping positions, at least the prize indicated by the prize value symbol.

In an example, at least one prize value symbol is an oversized prize value symbol that occupies more than one symbol position.

In an example, when the instructions are executed, they cause the processor to randomly select the size of the oversized prize value symbol from a set of possible sizes using the random number generator.

In an example, when the instructions are executed, they cause the processor to randomly determine, the value indicated by the prize value symbol using the random number generator.

In an example, at least one overlay symbol has an associated multiplier, and, upon the processor awards a prize of the value indicated by a prize value symbol multiplied by the associated multiplier upon an overlay symbol with an associated multiplier stopping in register with the prize value symbol.

In an example, the at least one game instance comprises a plurality of game instances of a feature game conducted in response to a trigger condition being met in a base game.

Another example embodiment provides a method of operating a gaming device comprising a display, a random number generator, and at least one input mechanism operable to input a wager, the method comprising:

selecting, using the random number generator, a subset of a plurality of symbol positions to be occupied by prize value symbols;

controlling the display to display prize value symbols at the subset of symbol positions;

selecting for at least one game instance using the random number generator, stopping positions for each of the plurality of reel strips, wherein each reel strip is associated with a column of the plurality of symbol positions, and wherein each reel strip comprises at least one overlay symbol and at least one blank symbols;

controlling the display to show the reel strips spinning on top of the prize value symbols such that (i) each respective prize value symbol is entirely visible when only blank symbols are in register with the respective prize value symbol, and (ii) each respective prize value symbol is at least partially obscured when at least one overlay symbol is in register with the respective prize value symbol;

controlling the display to show the reel strips spinning to the selected stopping positions; and awarding, for each respective prize value symbol is in register with the respective prize value symbol in the selected stopping positions, at least the prize indicated by the prize value symbol.

Another example embodiment provides a system comprising:

at least one display;

a random number generator;

at least one input mechanism operable to input a wager;

one or more processors; and memory storing instructions which, when executed by the one or more processors, cause the one or more processors to:

select, using the random number generator, a subset of a plurality of symbol positions to be occupied by prize value symbols;

control the at least one display to display prize value symbols at the subset of symbol positions;

select, for at least one game instance, using the random number generator, stopping positions for each of the plurality of reel strips, wherein each reel strip is associated with a column of the plurality of symbol positions, and wherein each reel strip comprises at least one overlay symbol and at least one blank symbols;

control the at least one display to show the reel strips spinning on top of the prize value symbols such that (i) each respective prize value symbol is entirely visible when only blank symbols are in register with the respective prize value symbol, and (ii) each respective prize value symbol is at least partially obscured when at least one overlay symbol is in register with the respective prize value symbol;

control the at least one display to show the reel strips spinning to the selected stopping positions; and award, for each respective prize value symbol is in register with the respective prize value symbol in the selected stopping positions, at least the prize indicated by the prize value symbol.

An example embodiment provides a gaming device comprising:

a display;

a random number generator;

at least one input mechanism operable to input a wager;

a processor; and a memory storing (i) reel data defining a plurality of reel strips, each reel strip comprising digit symbols and other symbols, and (ii) instructions which, when executed by the processor, cause the processor to:

select, using the random number generator, symbols from the reel strips for to form at least one row of symbols;

control the display to display the selected symbols; and upon the selected symbols or a respective row of symbols comprising only digit symbols, concatenate the digits of the digit symbols to form a multi-digit number; and make an award based on the multi-digit number.

In an example, when the instructions are executed, they cause the processor to make the award by applying a bet multiplier to the multi-digit number.

In an example, the at least one game instance comprises a plurality of game instances of a feature game conducted in response to a trigger condition being met in a base game.

In an example, at least some of the digit symbols comprise two digits.

Another example embodiment provides a method of operating a gaming device comprising a display, a random number generator, at least one input mechanism operable to input a wager, and a memory storing reel data defining a plurality of reel strips, each reel strip comprising digit symbols and other symbols, the method comprising:

selecting, using the random number generator, symbols from the reel strips for to form at least one row of symbols;

controlling the display to display the selected symbols; and upon the selected symbols or a respective row of symbols comprising only digit symbols, concatenating the digits of the digit symbols to form a multi-digit number; and making an award based on the multi-digit number.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a display;

a random number generator;

at least one input mechanism operable to input a wager;

a processor; and a memory storing (i) reel data defining a plurality of reel strips, (ii) a plurality of current feature states, and (iii) instructions which, when executed by the processor, cause the processor to:

control the display to display a plurality of feature game indicators that indicate respective ones of the current feature states and a feature game to which the respective ones of the current feature states correspond;

perform a selection operation using the random number generator and a feature state data structure to obtain a defined number of the current feature states to be active for a game instance of a spinning reel game;

control the display to visually indicate in connection with the feature game indicators, which of the plurality of feature states were selected to be active feature states for the game instance;

perform a symbol selection operation for the game instance, based on the reel data and using the random number generator, to obtain symbols for a plurality of symbol positions, wherein a first permutation of outcomes is associated with the spinning reel game and first computational resources;

control the display to display the selected symbols at the symbol positions;

determine an outcome in accordance with the selected symbols; and upon a trigger condition for an active feature state being met by the outcome, conduct the feature game to which the active feature state corresponds in accordance with the active feature state, wherein a second permutation of outcomes is associated with the feature game and is based on the first permutation of outcomes and feature game outcomes, and the second computational resources are equivalent to the first computational resources; and wherein conducting the feature game comprises controlling the display to visually indicate the feature game to which the active feature state corresponds to.

2. The gaming device of claim 1, wherein the feature game is one of a plurality of feature games represented by the plurality of feature games.

3. The gaming device of claim 2, wherein the memory stores more feature states than feature games and at least two of the active feature states correspond to the feature game.

4. The gaming device as claimed in claim 3, wherein the plurality of feature games comprises three feature games and wherein each feature game is associated with two current feature states.

5. The gaming device of claim 1, wherein the current feature states are a set of feature states corresponding to a current wager amount and the memory stores a plurality of other sets of feature states corresponding to other selectable wager amounts.

6. The gaming device of claim 1, wherein when the instructions are executed, they cause the processor to determine whether a trigger condition is met by:

determining whether the selected symbols meet a pre-trigger condition; and upon the pre-trigger condition being met, selecting one of the defined number of active feature states using the random number generator, and determining, using the random number generator, whether to trigger the feature game associated with the selected active feature state.

7. The gaming device of claim 6, wherein when the instructions are executed, they cause the processor to, upon the selected active feature state not being triggered and the selected active feature state not being a highest state, determine, using the random number generator, whether to increase the current state of the selected active feature state.

8. The gaming device of claim 6, wherein when the instructions are executed, they cause the processor to respond to the feature game being triggered by resetting the selected active feature state to a base state for a next game instance.

9. A method of operating a gaming device comprising a display, a random number generator, at least one input mechanism operable to input a wager, and memory storing reel data defining a plurality of reel strips and a plurality of current feature states, the method comprising:

controlling the display to display a plurality of feature game indicators that indicate respective ones of the current feature states and a feature game to which the respective ones of the current feature states correspond;

performing a selection operation using the random number generator and a feature state data structure to obtain a defined number of the current feature states to be active for a game instance of a spinning reel game;

controlling the display to visually indicate in connection with the feature game indicators, which of the plurality of feature states were selected to be active feature states for the game instance;

performing a symbol selection operation for the game instance, based on the reel data and using the random number generator, to obtain symbols for a plurality of symbol positions, wherein a first permutation of outcomes is associated with the spinning reel game and first computational resources;

controlling the display to display the selected symbols at the symbol positions;

determining an outcome in accordance with the selected symbols; and upon a trigger condition for an active feature state being met by the outcome, conducting the feature game to which the active feature state corresponds in accordance with the active feature state, wherein a second permutation of outcomes is associated with the feature game and is based on the first permutation of outcomes and feature game outcomes, and the second computational resources are equivalent to the first computational resources; and wherein conducting the feature game comprises controlling the display to visually indicate the feature game to which the active feature state corresponds to.

10. The method of claim 9, wherein the feature game is one of a plurality of feature games represented by the plurality of feature games.

11. The method of claim 10, wherein the memory stores more feature states than feature games.

12. The method of claim 11, wherein at least two of the active feature states correspond to the feature game.

13. The method of claim 12, wherein the plurality of feature games comprises three feature games and wherein each feature game is associated with two current feature states.

14. The method of claim 9, wherein the current feature states are a set of feature states corresponding to a current wager amount and the memory stores a plurality of other sets of feature states corresponding to other selectable wager amounts.

15. The method of claim 9, comprising determining, whether a trigger condition is met by:

determining whether the selected symbols meet a pre-trigger condition; and upon the pre-trigger condition being met, selecting one of the defined number of active feature states using the random number generator, and determining, using the random number generator, whether to trigger the feature game associated with the selected active feature state.

16. The method of claim 15, comprising, upon the selected active feature state not being triggered and the selected active feature state not being a highest state, determining, using the random number generator, whether to increase the current state of the selected active feature state.

17. The method of claim 16, comprising responding to the feature game being triggered by resetting the selected active feature state to a base state for a next game instance.

18. One or more non-transitory computer readable media comprising computer readable instructions which, when executed, cause one or more processors to:

control at least one display to display a plurality of feature game indicators that indicate respective ones of a plurality of current feature states and a feature game to which the respective ones of the current feature states correspond;

perform a selection operation using a random number generator and a feature state data structure to obtain a defined number of the current feature states to be active for a game instance of a spinning reel game;

control the at least one display to visually indicate in connection with the feature game indicators, which of the plurality of feature states were selected to be active feature states for the game instance;

performing a symbol selection operation for the game instance, based on a plurality of reel strips and using the random number generator, to obtain symbols for a plurality of symbol positions, wherein a first permutation of outcomes is associated with the spinning reel game and first computational resources;

control the at least one display to display the selected symbols at the symbol positions;

determine an outcome in accordance with the selected symbols; and upon a trigger condition for an active feature state being met by the outcome, conduct the feature game to which the active feature state corresponds in accordance with the active feature state, wherein a second permutation of outcomes is associated with the feature game and is based on the first permutation of outcomes and feature game outcomes, and the second computational resources are equivalent to the first computational resources; and wherein conducting the feature game comprises controlling the display to visually indicate the feature game to which the active feature state corresponds to.

19. The one or more non-transitory computer readable media of claim 18, wherein the feature game is one of a plurality of feature games represented by the plurality of feature games.

20. The one or more non-transitory computer readable media of claim 18, further comprising computer readable instruction to determine whether a trigger condition is met by:

determining whether the selected symbols meet a pre-trigger condition; and upon the pre-trigger condition being met, selecting one of the defined number of active feature states using the random number generator, and determining, using the random number generator, whether to trigger the feature game associated with the selected active feature state.

* * * * *